(12) United States Patent
Ickovic

(10) Patent No.: US 9,467,968 B2
(45) Date of Patent: Oct. 11, 2016

(54) WEARABLE MOBILE BROADCASTING RECOVERY SYSTEM AND DEVICE

(71) Applicant: ICKOVIC & BLISS, INC., East Hampton, NY (US)

(72) Inventor: Thomas S. Ickovic, East Hampton, NY (US)

(73) Assignee: Ickovic & Bliss, Inc., East Hampton, NY (US)

( * ) Notice: Subject to any disclaimer, the term of this patent is extended or adjusted under 35 U.S.C. 154(b) by 121 days.

(21) Appl. No.: 14/508,946

(22) Filed: Oct. 7, 2014

(65) Prior Publication Data

US 2015/0099472 A1     Apr. 9, 2015

Related U.S. Application Data

(60) Provisional application No. 61/887,796, filed on Oct. 7, 2013.

(51) Int. Cl.
| | |
|---|---|
| H04W 64/00 | (2009.01) |
| A01K 27/00 | (2006.01) |
| A01K 15/02 | (2006.01) |
| H04B 1/3827 | (2015.01) |

(52) U.S. Cl.
CPC .......... *H04W 64/006* (2013.01); *A01K 15/021* (2013.01); *A01K 27/001* (2013.01); *H04B 1/385* (2013.01); *H04B 2001/3855* (2013.01); *H04B 2001/3866* (2013.01)

(58) Field of Classification Search
CPC .......... H04B 1/385; H04B 2001/3855; H04B 2001/3866; H04B 7/26; H04W 64/006; A01K 15/021; A01K 27/001
See application file for complete search history.

(56) References Cited

U.S. PATENT DOCUMENTS

| | | |
|---|---|---|
| 5,343,534 A | 8/1994 | Dorrough et al. |
| 5,857,433 A | 1/1999 | Files |
| 6,043,748 A | 3/2000 | Touchton et al. |
| 6,067,018 A | 5/2000 | Skelton et al. |
| 6,172,640 B1 | 1/2001 | Durst et al. |
| 6,236,358 B1 | 5/2001 | Durst et al. |
| 6,271,757 B1 | 8/2001 | Touchton et al. |
| 6,283,065 B1 | 9/2001 | Shorrock et al. |
| 6,421,001 B1 | 7/2002 | Durst et al. |

(Continued)

FOREIGN PATENT DOCUMENTS

EP      1043671 A2      11/2000

OTHER PUBLICATIONS

International Search Report of PCT/US2014/059562 dated Jan. 21, 2015.

(Continued)

*Primary Examiner* — Lweis West
(74) *Attorney, Agent, or Firm* — Amster, Rothstein & Ebenstein, LLP

(57) ABSTRACT

The system provides a wearable communications device for pets comprising a band and a communications unit. The communications unit comprises one or more processors, a communications chipset, one or more removable batteries, and a speaker with a sound generation circuit. The communications chipset can receive data packets comprising an audio segment file; the one or more processors may convert the data packets into electronic signals; the sound generation circuit may cause the speaker to play an audio message corresponding to the electronic signals.

18 Claims, 46 Drawing Sheets

(56) References Cited

U.S. PATENT DOCUMENTS

| | | |
|---|---|---|
| 6,441,778 B1 | 8/2002 | Durst et al. |
| 6,480,147 B2 | 11/2002 | Durst et al. |
| 6,502,060 B1 | 12/2002 | Christian |
| 6,518,919 B1 | 2/2003 | Durst et al. |
| 6,693,585 B1 | 2/2004 | MacLeod |
| 6,700,492 B2 | 3/2004 | Touchton et al. |
| 6,720,879 B2 | 4/2004 | Edwards |
| 6,721,681 B1 | 4/2004 | Christian et al. |
| 6,771,213 B2 | 8/2004 | Durst et al. |
| 6,830,014 B1 | 12/2004 | Lalor |
| 6,859,171 B2 | 2/2005 | Durst et al. |
| 6,874,447 B1 | 4/2005 | Kobett |
| 6,923,146 B2 | 8/2005 | Kobitz et al. |
| 6,956,483 B2 | 10/2005 | Schmitt et al. |
| 6,970,090 B1 | 11/2005 | Sciarra |
| 7,113,126 B2 | 9/2006 | Durst et al. |
| 7,209,075 B2 | 4/2007 | Durst et al. |
| 7,267,082 B2 | 9/2007 | Lalor |
| 7,324,044 B2 | 1/2008 | Durst et al. |
| 7,336,227 B2 | 2/2008 | Durst et al. |
| 7,409,924 B2 | 8/2008 | Kates |
| 7,411,492 B2 | 8/2008 | Greenberg |
| 7,420,473 B2 | 9/2008 | Eicken et al. |
| 7,434,541 B2 | 10/2008 | Kates |
| 7,562,640 B2 | 7/2009 | Lalor |
| 7,564,405 B2 | 7/2009 | Durst et al. |
| 7,634,975 B2 | 12/2009 | Kates |
| 7,656,290 B2 | 2/2010 | Fein et al. |
| 7,705,736 B1 | 4/2010 | Kedziora |
| 7,710,263 B2 | 5/2010 | Boyd |
| 7,760,137 B2 | 7/2010 | Martucci et al. |
| 7,764,228 B2 | 7/2010 | Durst et al. |
| 7,786,876 B2 | 8/2010 | Troxler |
| 7,821,406 B2 | 10/2010 | Wangrud |
| 7,861,676 B2 | 1/2011 | Kates |
| 7,990,274 B2 | 8/2011 | Hill |
| 8,031,067 B2 | 10/2011 | Greenberg |
| 8,156,901 B2 | 4/2012 | Muelken |
| 8,188,869 B2 | 5/2012 | Wangrud |
| 8,248,248 B1 | 8/2012 | Hill |
| 8,258,942 B1 | 9/2012 | Lanzone et al. |
| 8,314,695 B2 | 11/2012 | Greenberg |
| 8,438,999 B2 | 5/2013 | Hardi et al. |
| 8,467,770 B1 * | 6/2013 | Ben Ayed ............. H04L 63/107 455/41.1 |
| 2002/0053324 A1 * | 5/2002 | Kato .................. A01K 13/006 119/856 |
| 2004/0061606 A1 | 4/2004 | Gronvold |
| 2005/0035865 A1 | 2/2005 | Brennan et al. |
| 2005/0059426 A1 | 3/2005 | Aarnio et al. |
| 2006/0196445 A1 | 9/2006 | Kates |
| 2007/0034165 A1 | 2/2007 | Yang |
| 2007/0107668 A1 | 5/2007 | Eaton et al. |
| 2007/0136102 A1 | 6/2007 | Rodgers |
| 2007/0204803 A1 | 9/2007 | Ramsay |
| 2007/0204804 A1 | 9/2007 | Swanson et al. |
| 2007/0221140 A1 | 9/2007 | Warren et al. |
| 2007/0261645 A1 * | 11/2007 | Van de Merwe .... A01K 15/021 119/792 |
| 2008/0036594 A1 | 2/2008 | Kates |
| 2008/0163057 A1 | 7/2008 | Lohi et al. |
| 2008/0255468 A1 | 10/2008 | Derchak et al. |
| 2008/0272920 A1 | 11/2008 | Brown |
| 2009/0038670 A1 | 2/2009 | Shu |
| 2009/0267829 A1 | 10/2009 | Mitchell et al. |
| 2009/0289785 A1 | 11/2009 | Leonard |
| 2009/0289844 A1 | 11/2009 | Palsgrove et al. |
| 2011/0193706 A1 | 8/2011 | Dickerson |
| 2011/0287780 A1 | 11/2011 | Spire |
| 2012/0006282 A1 | 1/2012 | Kates |
| 2012/0086574 A1 * | 4/2012 | Blumel ................. A61B 5/1112 340/573.3 |
| 2012/0182145 A1 | 7/2012 | Jameson et al. |
| 2012/0206296 A1 | 8/2012 | Wan |
| 2012/0252486 A1 | 10/2012 | Lopez et al. |
| 2013/0027207 A1 | 1/2013 | Goetzl et al. |
| 2013/0113621 A1 | 5/2013 | So |
| 2013/0118418 A1 | 5/2013 | Lalor |

OTHER PUBLICATIONS

Written Opinion of the International Searching Authority for PCT/US2014/059562 dated Jan. 21, 2015.

* cited by examiner

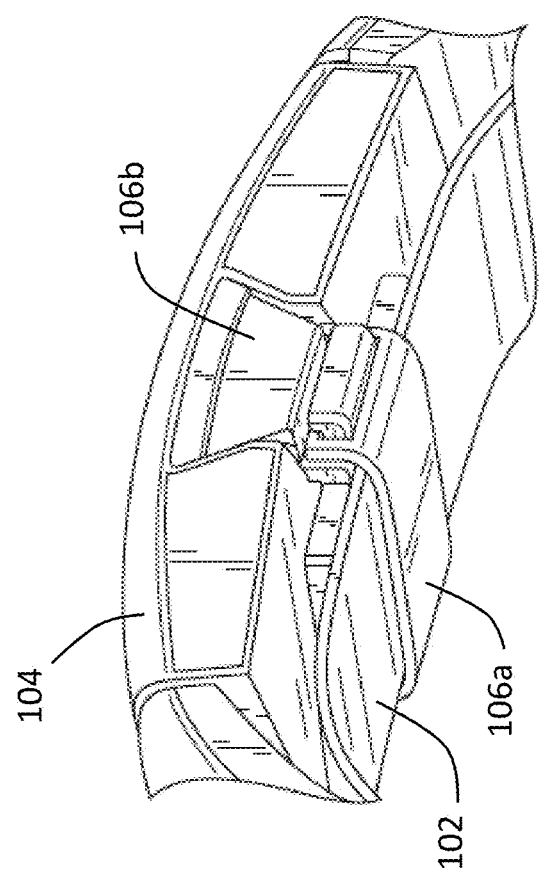

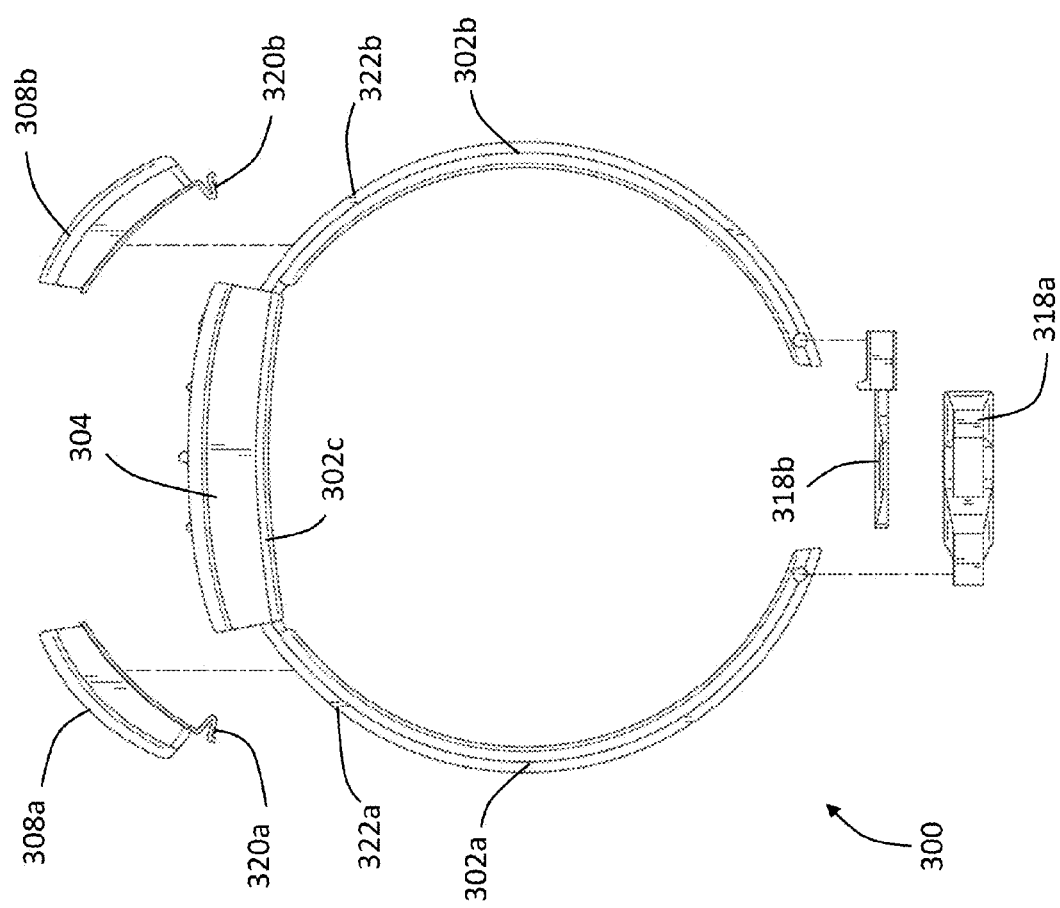

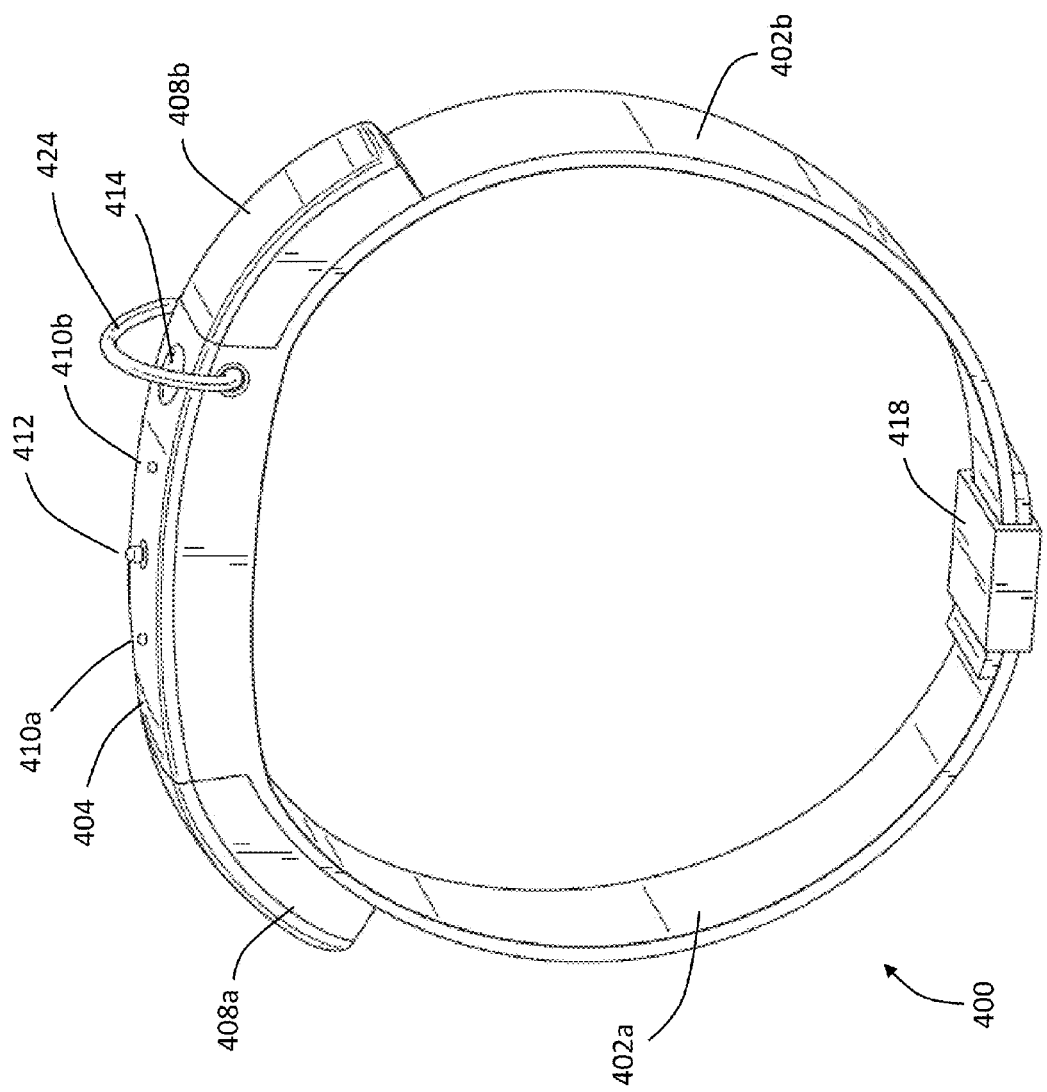

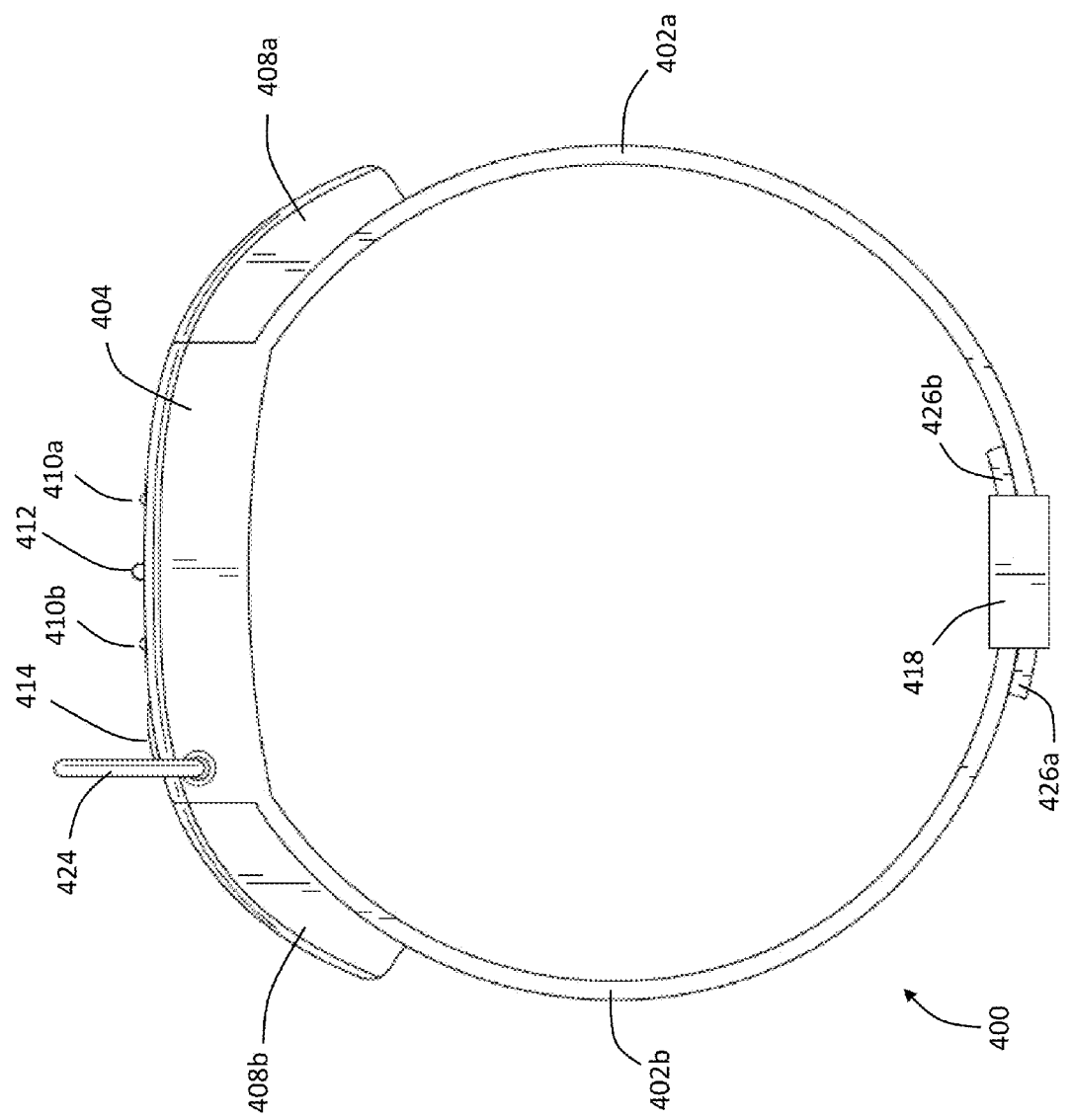

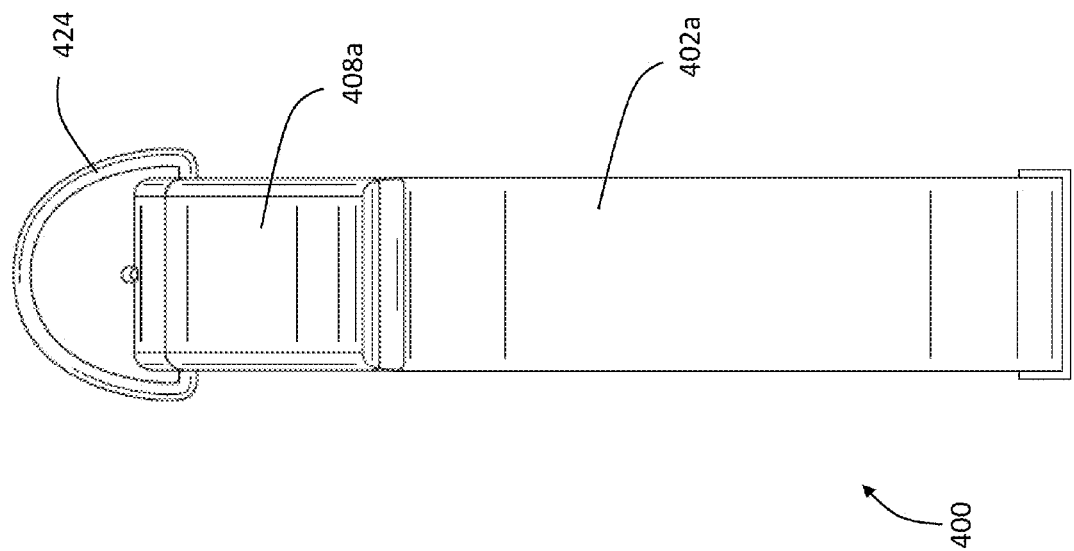

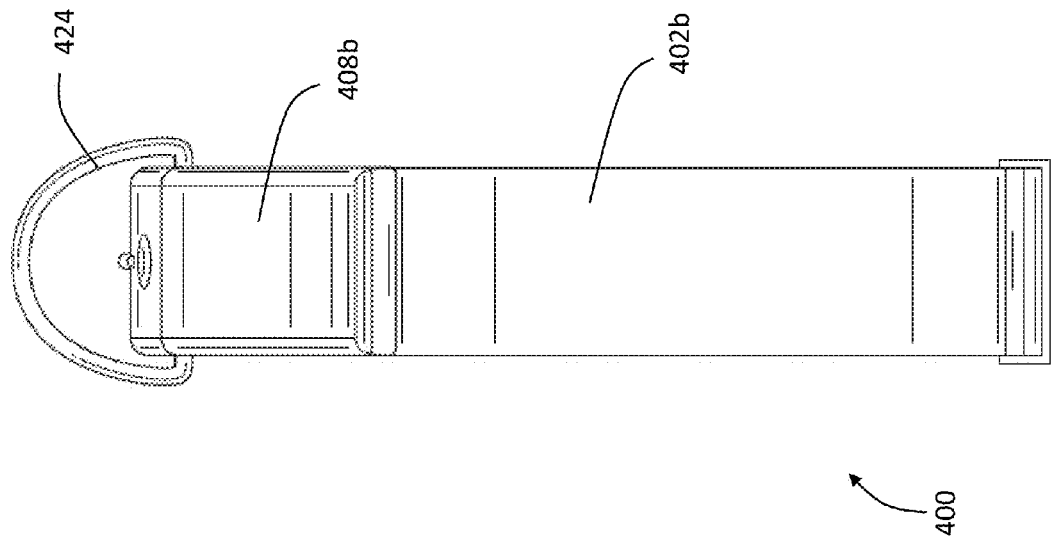

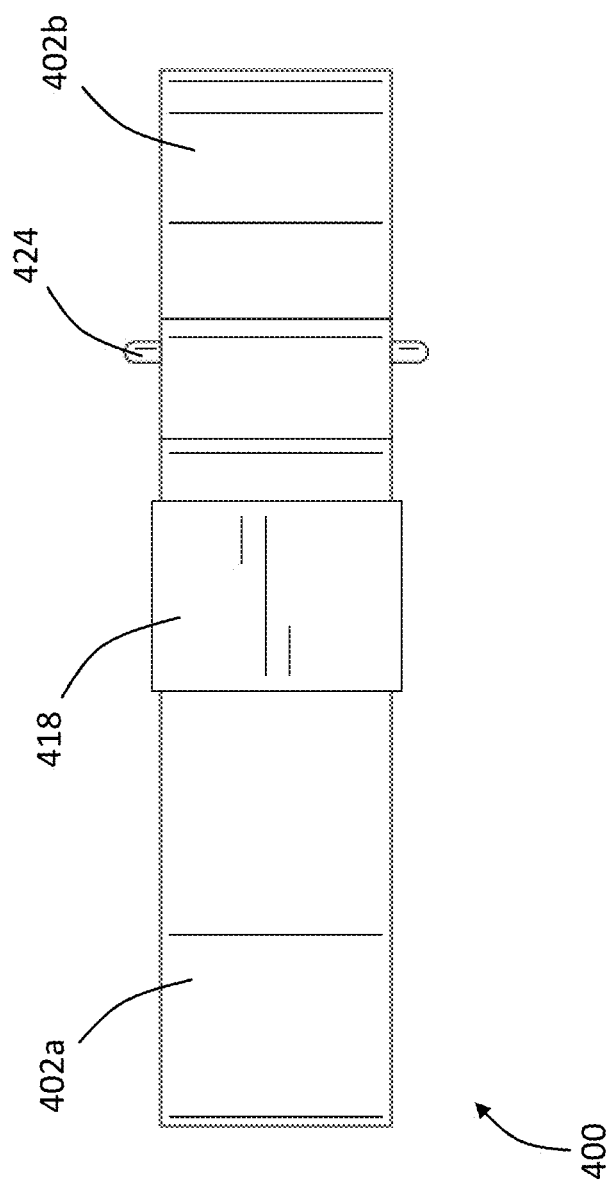

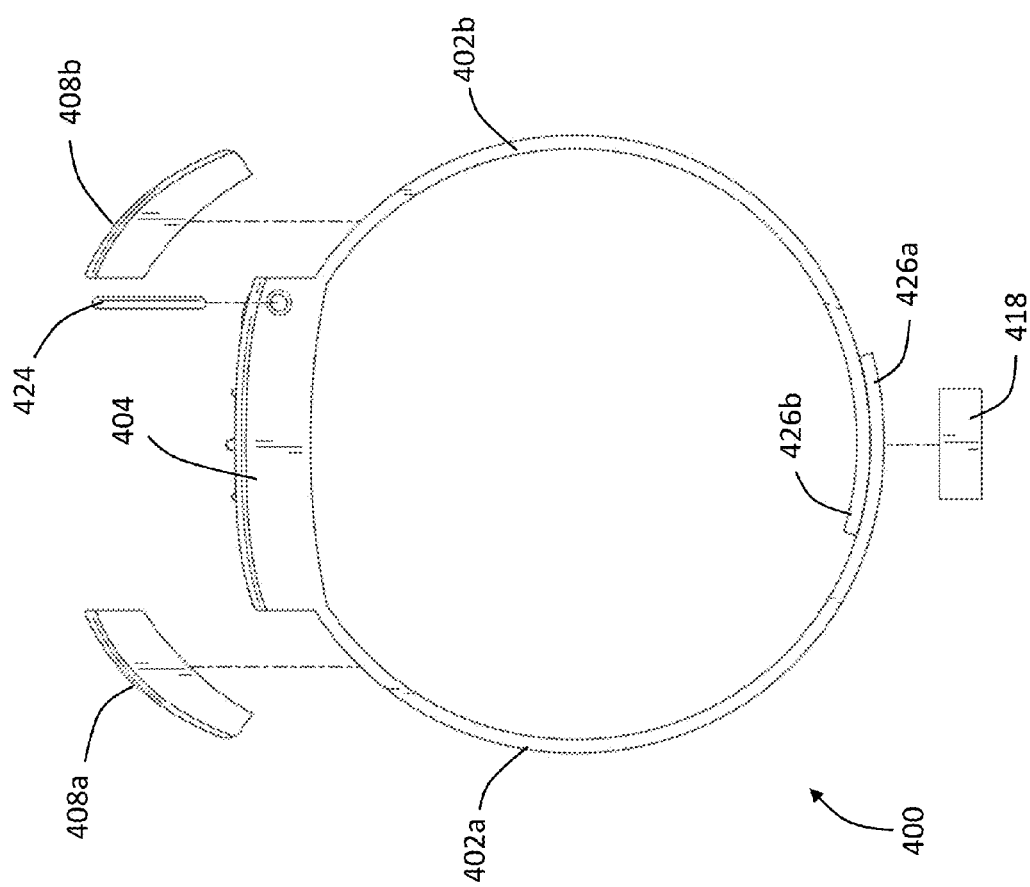

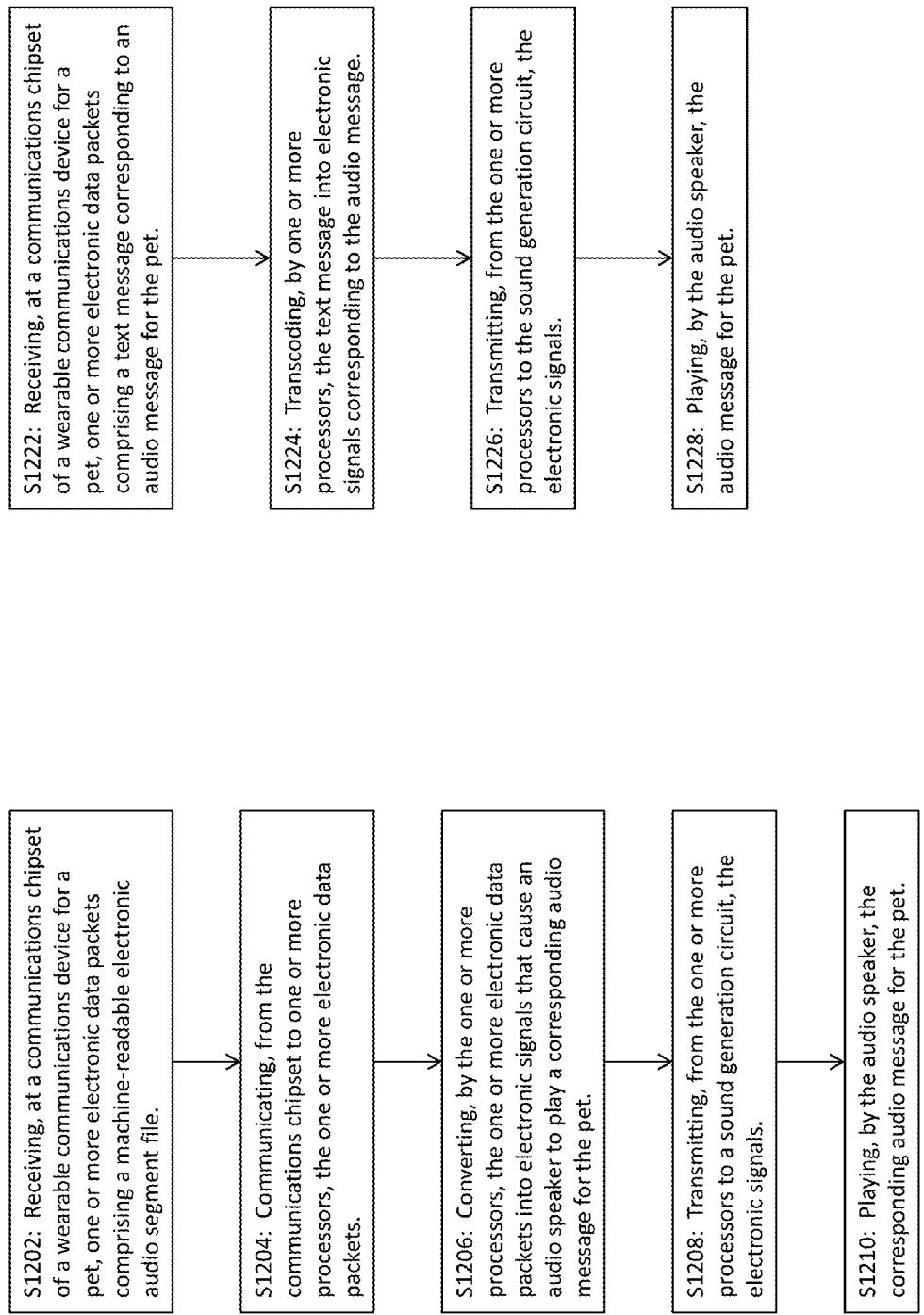

WEARABLE MOBILE BROADCASTING RECOVERY SYSTEM AND DEVICE

RELATED APPLICATION

This application claims priority to U.S. Ser. No. 61/887,796, filed on Oct. 7, 2013, the content of which is incorporated by reference as if fully set forth herein.

FIELD

The present invention relates generally to wireless communication systems. In embodiments, the present invention is a multi-purpose wireless device that allows two-way communications, ambient conditions monitoring, pet tracking, and missing pet broadcasts. The combination of these systems may be employed as a collar for a pet such as a canine or feline.

SUMMARY

The present invention is generally directed toward devices, systems, methods, and program products, for communications with a wearable wireless device for a pet.

In embodiments, a wearable communications device for a pet may be provided. The device may comprise a band with fastenable ends having an elongated body portion corresponding to the neck of the pet and a communications unit attached to the band.

In embodiments, the communications unit may comprise a communications chipset, one or more processors operably connected to the communications chipset, a sound generation circuit comprising an audio speaker, the sound generation circuit operably connected to the one or more processors, one or more removable batteries providing power to the communications unit, and non-transitory computer-readable memory.

In embodiments, the non-transitory computer-readable memory may have stored thereon machine-readable instructions configured to perform the steps of receiving, at the communications chipset, one or more first electronic data packets comprising a machine-readable electronic audio segment file; communicating, from the communications chipset to the one or more processors, the one or more first electronic data packets; converting, by the one or more processors, the one or more first electronic data packets into first electronic signals that cause the audio speaker to play a corresponding first audio message for the pet; transmitting, from the one or more processors to the sound generation circuit, the first electronic signals; and playing, by the audio speaker, the corresponding first audio message for the pet.

In embodiments, the machine-readable instructions may be further configured to perform the steps of receiving, at the communications chipset, one or more second electronic data packets comprising a text message corresponding to a second audio message for a pet; transcoding, by the one or more processors, the text message into second electronic signals corresponding to the second audio message; transmitting, from the one or more processors to the sound generation circuit, the second electronic signals; and playing, by the audio speaker, the second audio message for the pet.

In embodiments, the non-transitory computer-readable memory may have stored thereon machine-readable instructions configured to perform the steps of receiving, at the communications unit, one or more first electronic data packets comprising one or more machine-readable electronic audio segment files each corresponding to an audio message for a pet; storing, in the non-transitory computer-readable memory, the one or more machine-readable electronic audio segment files; receiving, at the communications chipset, one or more second electronic data packets comprising second machine-readable instructions to play one of the one or more machine-readable electronic audio segment files; communicating, from the communications chipset to the one or more processors, the one or more second electronic data packets; transmitting, from the one or more processors to the sound generation circuit in response to the one or more second electronic data packets, electronic signals corresponding to the one of the one or more machine-readable electronic audio segment files; and playing, by the audio speaker, the corresponding audio message for the pet.

In embodiments, the step of receiving, at the communications unit, one or more first electronic data packets comprising one or more machine-readable electronic audio segment files may comprise receiving, via the communications chipset, one or more uploaded audio segment files.

In embodiments, the wearable communications device may further comprise a microphone and an analog-to-digital audio converter, and the step of receiving, at the communications unit, one or more first electronic data packets comprising one or more machine-readable electronic audio segment files may comprise receiving, via the microphone, an input audio wave; and converting, by the analog-to-digital audio converter, the input audio wave to an electronic audio segment file.

In embodiments, the first audio message may comprise at least one audio component within a frequency range of 15-60 kHz. In embodiments, the first audio message may comprise at least one audio component within a frequency range of 23-54 kHz.

In embodiments, the band of the wearable communications device may be a pet collar. In embodiments, the band may form a portion of a pet harness. In embodiments, the communications unit may be integral to the band. In other embodiments, the communications unit may be removably attached to the band. In embodiments, the band may be light reflective.

In embodiments, the wearable communications device may further comprise at least one of a pre-programmed communication transmission button, one or more microphones, one or more light sources, one or more cameras, one or more digital display screens, or a GPS receiver. In embodiments, the wearable communications device may further comprise at least one of one or more antennas, a temperature sensor, an accelerometer, and/or a noise sensor.

In embodiments, the communications unit may further comprise a location information chipset.

In embodiments, the machine-readable instructions stored on the non-transitory computer-readable memory may be further configured to perform the steps of determining, by the location information chipset, a first position of the communications device corresponding to a first time; communicating, from the location information chipset to the one or more processors, the first position; determining, by the location information chipset, a second position of the communications device corresponding to a second time; communicating, from the location information chipset to the one or more processors, the second position; calculating, by the one or more processors, an average speed based at least in part on the first position and the second position; determining, by the one or more processors, whether the average speed exceeds a predefined threshold speed; generating, by the one or more processors, an electronic message indicating that the predefined threshold speed was exceeded; communicating, from the one or more processors to the communications chipset, the electronic message; and transmitting, by the communications chipset, the electronic message.

In embodiments, the wearable communications device may communicate with a user device, such as a mobile phone, smart phone, PDA, computer, and/or portable computer, to name a few. In embodiments, the user device and the wearable communications device may connect and/or communicate directly (e.g., wirelessly, such as via Bluetooth) or via a local data network, e.g., using Wi-Fi. Communications can comprise transmitting and/or receiving data packets. In embodiments, the user device and the wearable communications device may connect indirectly, such as using a cellular data network, mobile broadband, and/or other Internet access points to transmit and/or receive data packets.

In embodiments, a user interface may be provided on the user device via a downloadable software application and/or via a website accessible at a URL address. The user interface may provide an interface for generating, editing, and/or sending pre-recorded audio segment files to the wearable communications device. The user interface may provide an interface for receiving location information from the wearable communications device. In embodiments, the user interface may provide alerts and/or notifications associated with location and/or movement of the wearable communications device.

In embodiments, the wearable communications device may enter a power-saving mode, e.g., a standby mode, when one or more measurements from a motion sensor integrated into the device fall below a threshold. In embodiments, the device may enter a power-saving mode when it is within a predefined proximity to a user device. For example, when a Bluetooth communications system of the wearable communications device detects a recognized user device, the power-saving mode may be entered.

In embodiments, the present invention may provide connectivity with a social media network for pets and/or pet owners. In embodiments, the present invention may provide a system for transmitting broadcast communications to people near the wearer of the wireless device. In embodiments, the present invention may provide a system for sending signals to the owner and/or caregiver of the wearer of the wireless device. In embodiments, the present invention may provide a system for sending signals to a home system, e.g. security system.

BRIEF DESCRIPTION OF THE DRAWINGS

The invention will be described with reference to the exemplary embodiments and the drawings thereof.

FIG. 2A is a perspective view of connectors coupling the body of a wearable communications device to a band according to an exemplary embodiment of the present invention;

FIG. 3H is an exploded view of a wearable communications device according to an exemplary embodiment of the present invention;

FIG. 4A is a perspective view of a wearable communications device according to an exemplary embodiment of the present invention;

FIGS. 4B-C are profile views of a wearable communications device according to an exemplary embodiment of the present invention;

FIGS. 4D-E are side views of a wearable communications device according to an exemplary embodiment of the present invention;

FIG. 4G is a bottom view of a wearable communications device according to an exemplary embodiment of the present invention;

FIG. 4H is an exploded view of a wearable communications device according to an exemplary embodiment of the present invention;

FIGS. 12A-C are flow charts of exemplary processes for playing an audio message at a wearable communications device in accordance with exemplary embodiments of the present invention.

DETAILED DESCRIPTION

The present invention generally relates to a wearable device for communicating with, tracking, and/or recovering pets, such as dogs or cats. The wearable device is wireless and may provide connectivity with one or more user electronic devices, such as smart phones, computers, to name a few. In embodiments, the wearable device may facilitate interactions in a social media network associated with pets and/or pet owners.

FIGS. 1A-G illustrate various views of a wearable communications device in accordance with an exemplary embodiment of the present invention.

Figure 1A:
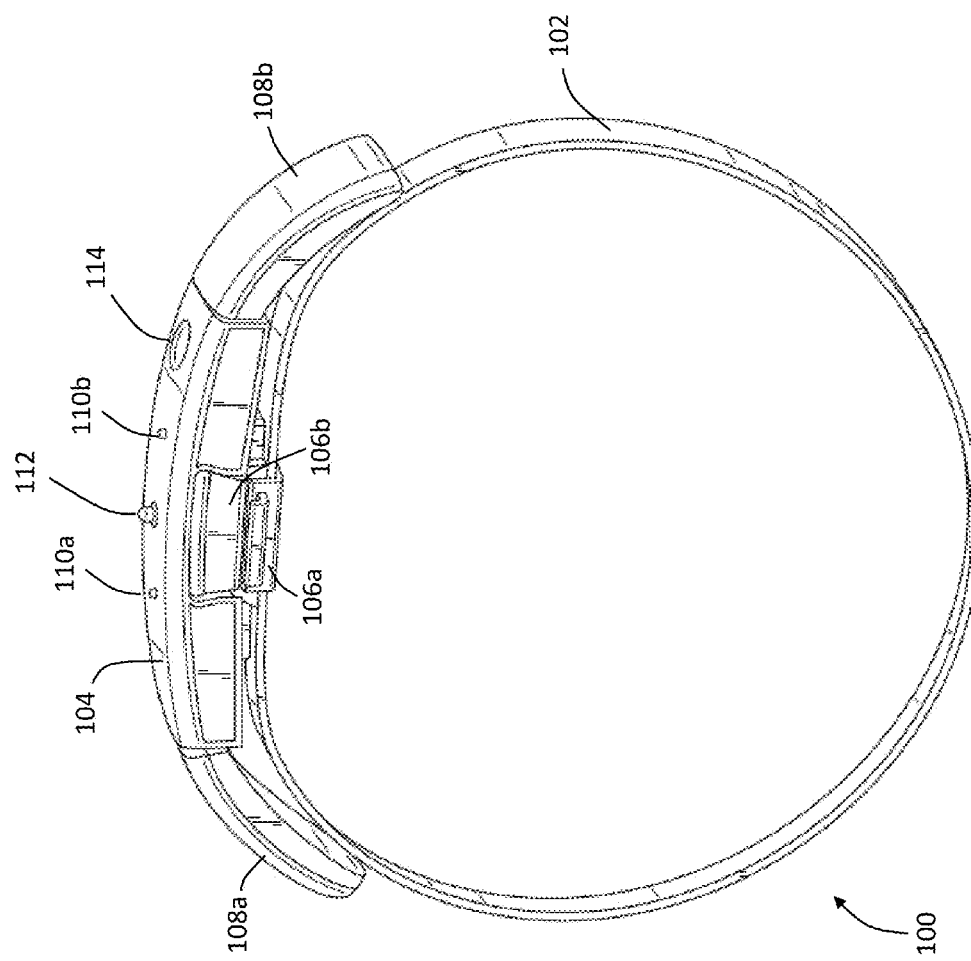
FIG. 1A is a perspective view of a wearable communications device according to an exemplary embodiment of the present invention.

FIG. 1A is a perspective view of a wearable communications device 100 according to an exemplary embodiment of the present invention. The wearable communications device 100 can comprise a band 102 and a communications unit 104. Connectors 106a and 106b can attach the communications unit 104 to the band 102. Accordingly, the communications unit 104 may be removable from the band 102.

The band 102 may have fastenable ends and an elongated body portion corresponding to the neck of the pet. In embodiments, the band 102 may be a pet collar, which may have its own clasp to adjust the size and/or to take the collar on and/or off the pet. In embodiments, band 102 may form a portion of a pet harness. Accordingly, in embodiments, the communications unit 104 may be removably attached to the band 102, while in other the communications unit 104 may be integral to the band 102. The band 102 may come in different lengths to be appropriate of different neck sizes. The band 102 may be made from cloth, nylon, plastic, and/or leather to name a few.

In embodiments, reflective elements may be included which could be attached to the band 102 and/or the communications unit 104.

Connectors 106a and 106b can be interconnectable elements each fastened to one of the band 102 and communications unit 104. Connectors 106a and 106b may be made from plastic or metal or a combination of the two. Connectors 106a and 106b may be comprised of male and female elements, may include interlocking elements and may comprise adhesive or hook and loop fasteners. Connectors 106a and 106b may include a button or other element for disengaging the connectors from one another.

Figure 2B:
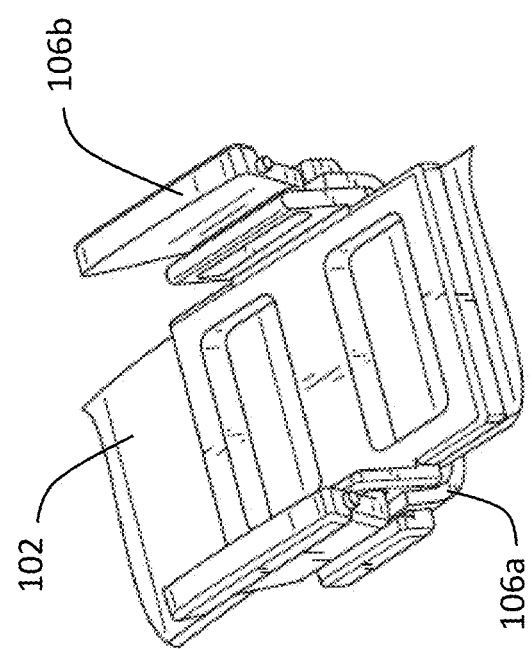
FIG. 2B is a perspective view of connectors attached to a band according to an exemplary embodiment of the present invention.

FIGS. 2A-B are perspective views illustrating connectors 106a and 106b of the exemplary embodiment. FIG. 2A shows the connectors 106a and 106b attaching the band 102 to the body of the communications unit 104, and FIG. 2B shows the connectors attached to the band 102 without the communications unit 104. The connectors 106 may comprise two components, band connector 106a, which may attach directly to band 102, and body connector 106b, which may attach directly to the body of communications unit 104. Band connector 106a may mate with body connector 106b to attach the band 102 to the body.

Figure 6:
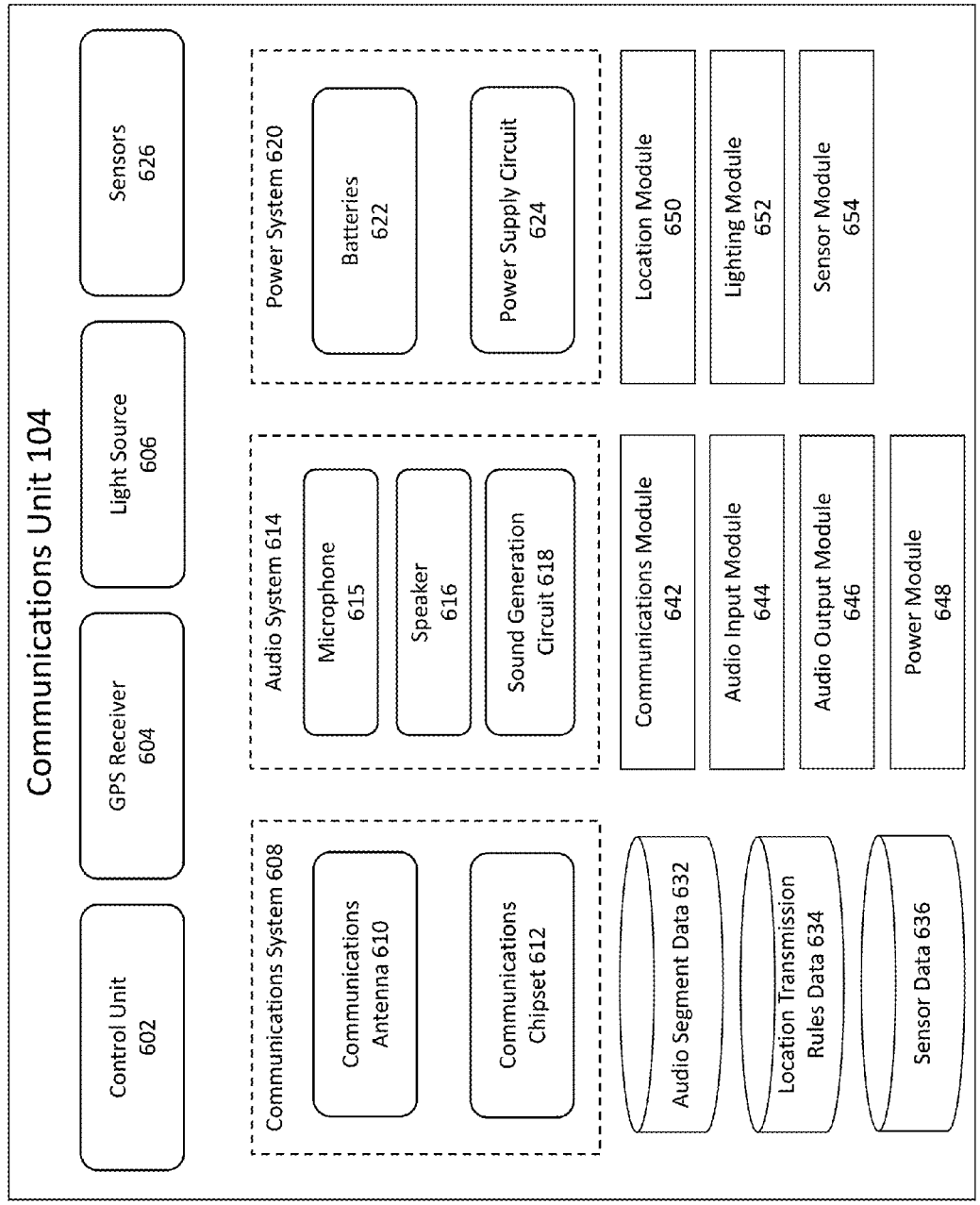
FIG. 6 is a schematic diagram of a communications unit of a wearable communications device according to exemplary embodiments of the present invention.

Referring again to FIG. 1A, the body of the communications unit 104 can house one or more processors, circuitry, sensors, and hardware such as speakers, as described herein with respect to FIG. 6. The wearable communications device 100 can have a display and/or one or more light sources, e.g., light sources 110a and 110b. The display can be a touch screen display or a non-interactive display such as an LED or OLED, to name a few. The light sources may comprise one or more LEDs or incandescent light bulbs. In embodiments, the light sources can provide white and/or colored light and/or may provide steady, blinking and/or strobing light. The wearable device can also include an indicator light 112, which may be used to indicate statuses and/or modes of the communications device 104, such as battery level, GPS status (e.g., receiving and/or transmitting location data), receipt of a message, communications connectivity, active mode, and/or standby mode, to name a few.

The communications unit 104 can further include one or more removable batteries 108, e.g., batteries 108a and 108b. The device may be operable with only one of multiple batteries attached to it. The batteries 108 may be rechargeable. In embodiments, the batteries 108 may pivot at their attachment points to the body of the communications unit 104, e.g., to accommodate different diameter bands 102. In embodiments, the batteries 108a and 108b may be in a separate component from communications unit 104 and operably connected. Preferably, the batteries incorporate safety features for over-charging, under-voltage and over-current. Batteries 108a and 108b are preferably mounted in parallel such that one does not charge the other. Preferably, batteries 108a and 108b are in communication with a control unit 602 such that battery levels and status of the batteries can be determined. Wearable communications device 100 may operate while one of batteries 108a and 108b is removed such that continuous operation is possible while the removed battery is recharged. In embodiments, communications unit 104 can include one or more internal batteries as well as external batteries.

The wearable communications device 100 can have a pre-programmed communications transmission button 114. Upon depressing such a button, a pre-programmed message may be transmitted, e.g., to a user device associated with the wearable communications device 100. In embodiments, the pre-programmed message may provide an alert at the user device. Accordingly, such a button may be an SOS button, which a finder of a lost pet wearing the wearable communications device 100 can press to notify the pet owner that the pet was found. Button 114 preferably includes mechanical elements to limit the occurrence of false triggers, such as an overhanging edge. Button 114 may also function only after it is depressed for a set period of time, such as three seconds, so that accidental depressions do not activate an alert. In embodiments, the button may cause initiation of two-way communications with a user device. In embodiments, a preprogrammed telephone number (e.g., associated with an owner of the wearable communications device, such as the pet owner) may be called. In embodiments, a message may be transmitted to a preprogrammed telephone number and/or an IP-based communications network account (e.g., an account associated with the owner of a wearable communications device). In embodiments, button 114 may be a push-to-talk button, which can transmit audio data when depressed, and which may be programmed to transmit the audio to a user device associated with the owner of the wearable communications device.

Figure 1B:
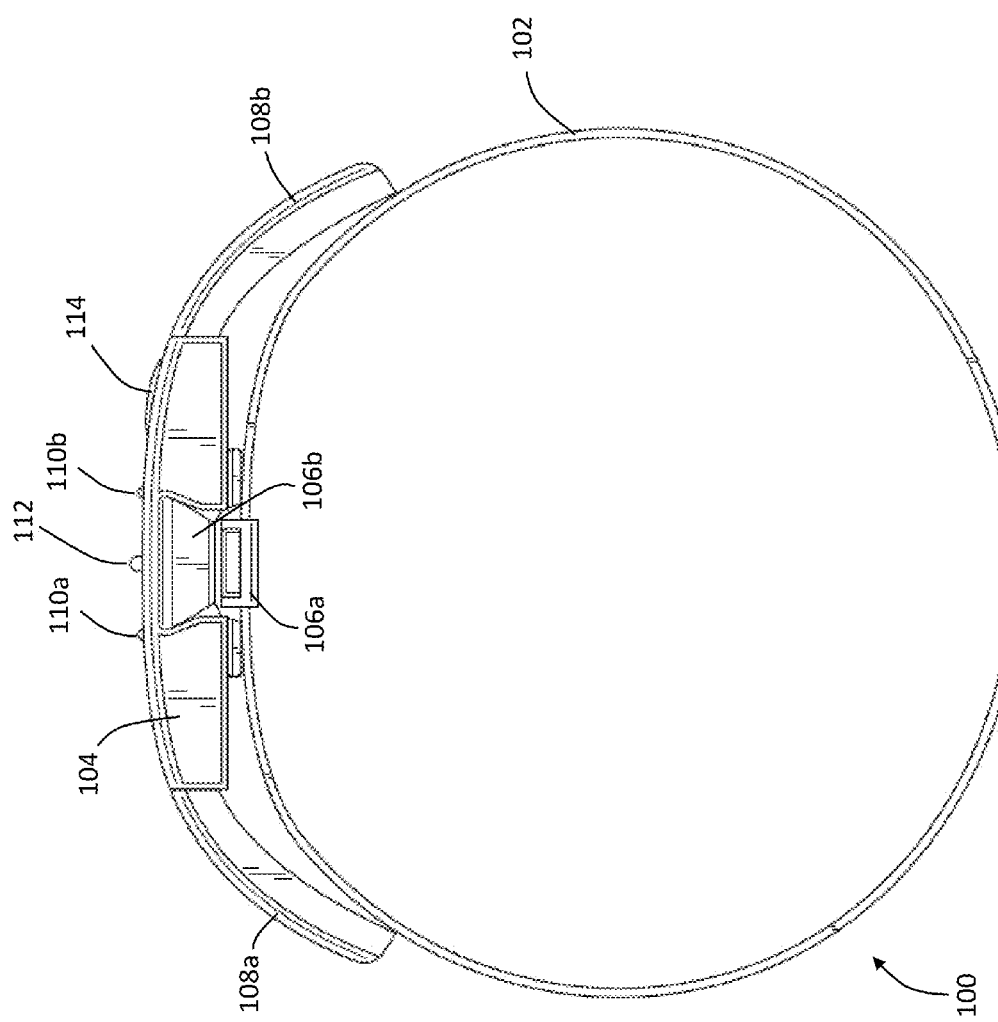
FIGS. 1B-C are profile views of a wearable communications device according to an exemplary embodiment of the present invention.
Figure 1C:
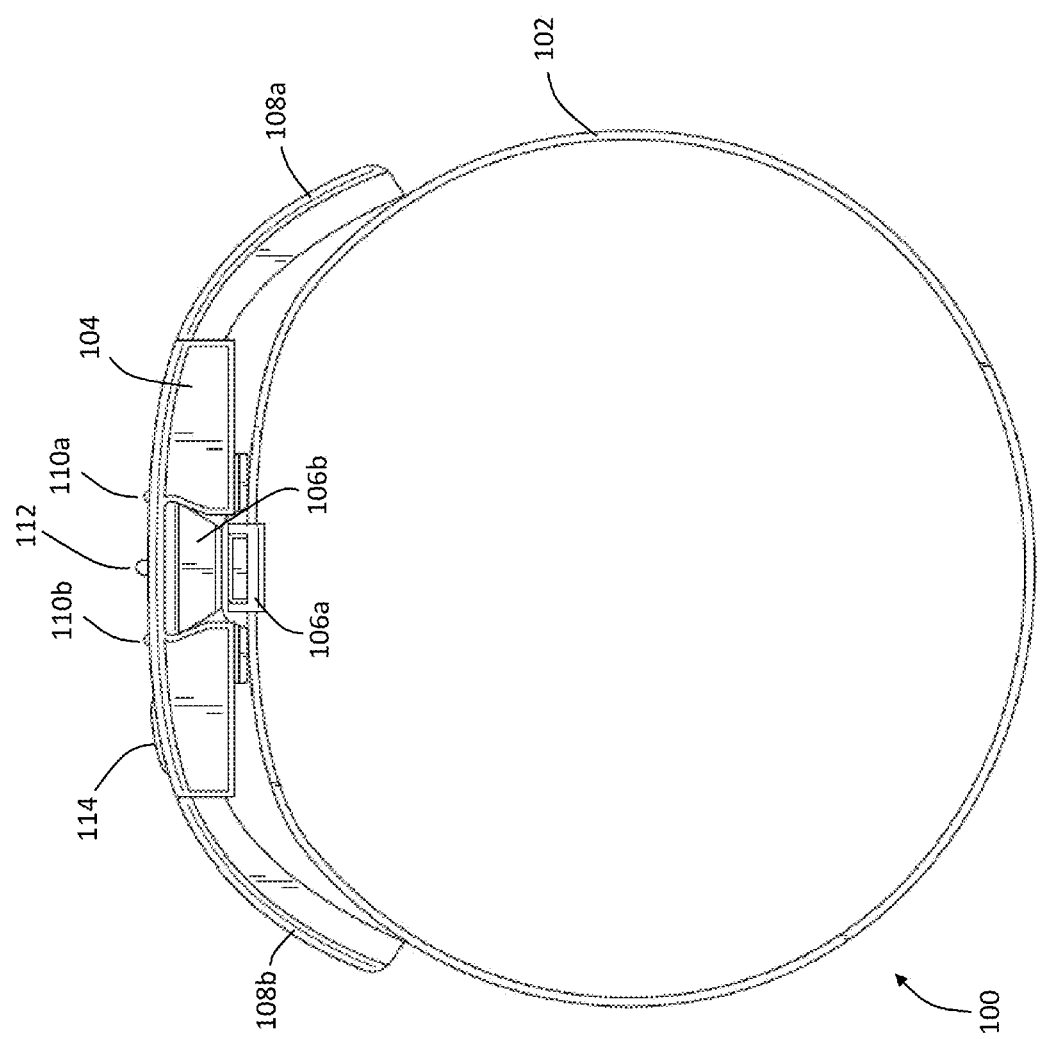
Figure 1D:
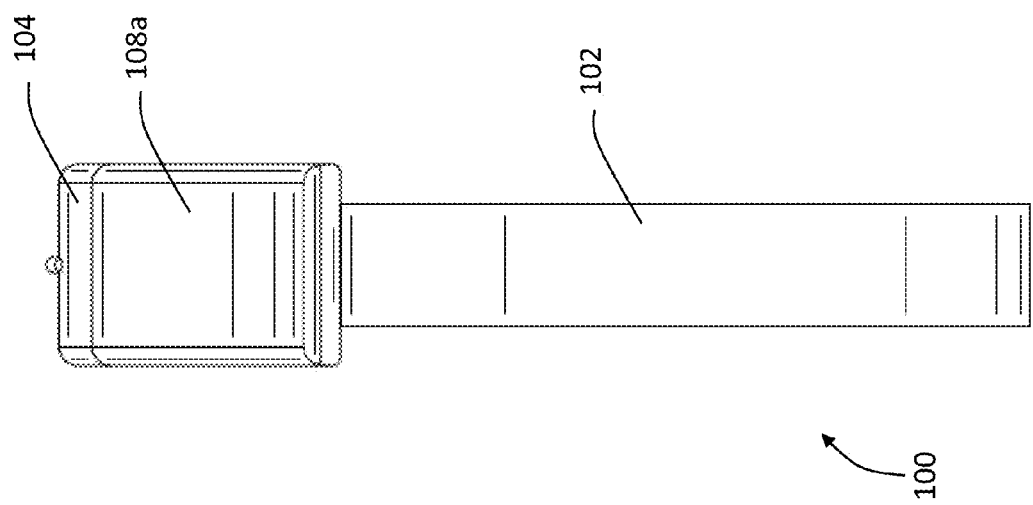
FIGS. 1D-E are side views of a wearable communications device according to an exemplary embodiment of the present invention.
Figure 1E:
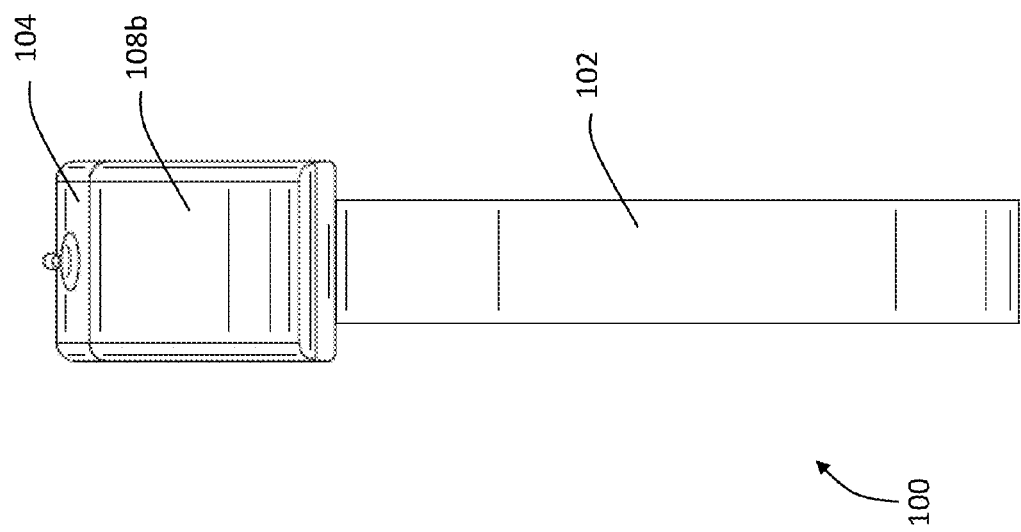
Figure 1F:
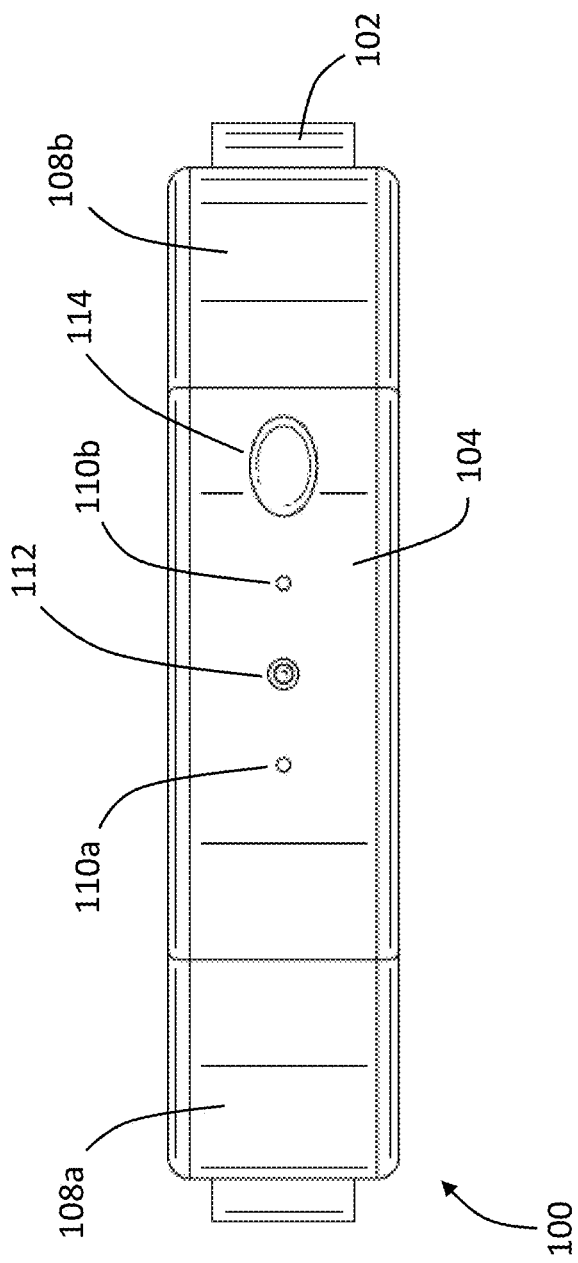
FIG. 1F is a top view of a wearable communications device according to an exemplary embodiment of the present invention.
Figure 1G:
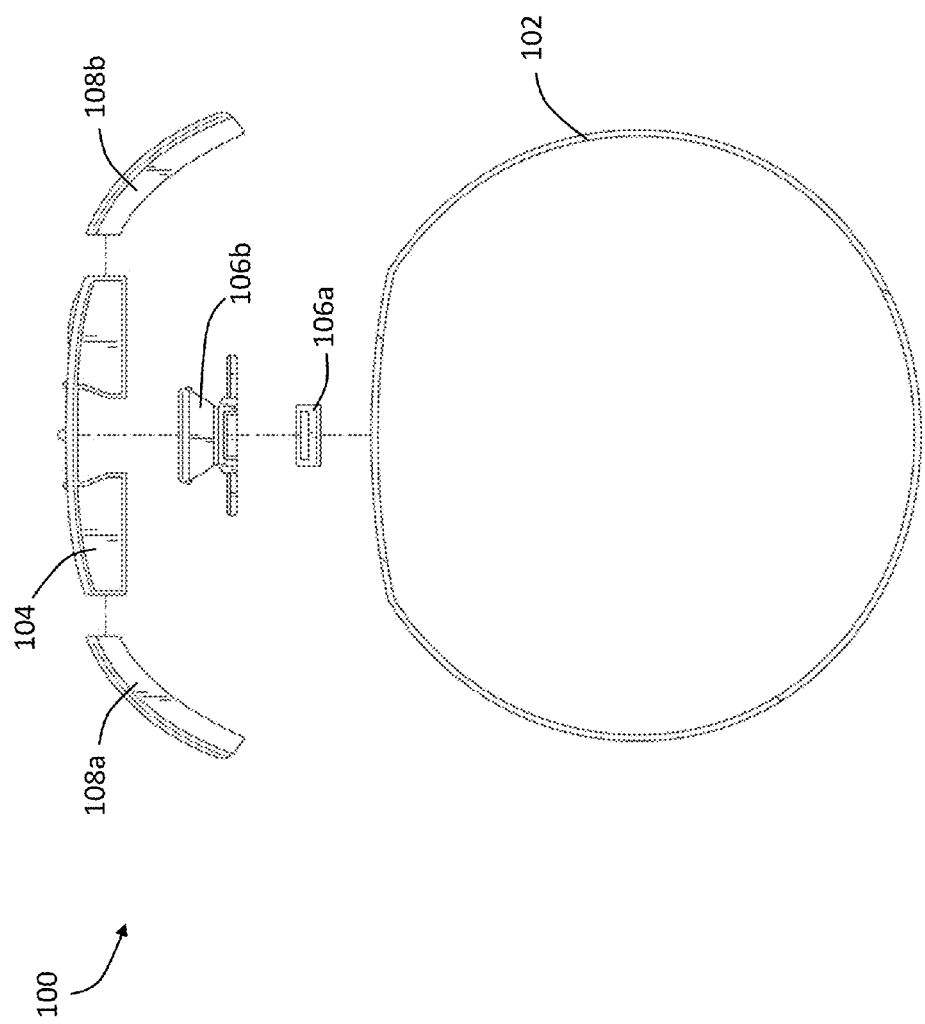
FIG. 1G is an exploded view of a wearable communications device according to an exemplary embodiment of the present invention.

FIGS. 1B-G illustrate additional views of the wearable communications device according to the exemplary embodiment. FIGS. 1B-C are profile views of the exemplary wearable communications device. FIGS. 1D-E are side views. FIG. 1F is a top view. FIG. 1G is an exploded view.

FIG. 6 is an exemplary schematic diagram of a communications unit 104. The communications unit 104 comprises one or more hardware components and/or software components. Hardware components can include a control unit 602, a GPS receiver 604, one or more light source 606, one or more sensors 626, a communications system 608, an audio system 614, and/or a power system 620. One or more hardware components may be operably connected to one or more other components of the communications unit 104. The communications unit 104 can further include non-transitory computer-readable memory, which may be operably connected to the control unit 602, and which may have stored thereon one or more software modules, such as a communications module 642, an audio input module 644, an audio output module 646, a power module 648, a location module 650, a lighting module 652, and/or a sensor module 654. Such modules may control one or more electronic hardware components. In embodiments, one or more modules may perform the functions described with respect to one or more other modules.

The communications unit 104 includes a control unit 602, which may be a central processing unit ("CPU") and may comprise one or more processors and/or cores. In embodiments, two or more electronic hardware components, such as the control unit 602 and a communications system 608, may be components of a single chip. The control unit 602 may include multiple chips or processor cores on a chip. Some chips or cores may be configured for a particular task, such as responding to commands, and may operate in a standby or low power mode when not in use. The control unit 602 can coordinate data and power distribution among electronic hardware components of the device and can control operation of the hardware components, such as a GPS receiver 604, light source 606, indicator light, sensors 626, communications system 608, audio system 614, and/or power system 620.

The control unit 602 may be operably connected to one or more other components of the communications unit 104. In embodiments, electronic hardware components may communicate with each other through the control unit 602. For example, the communications system 608 can communicate locally with the GPS receiver 604 via the control unit, and through commands received from the communications system 608 the control unit 602 can issue commands to the GPS receiver, e.g., to enter a power-saving mode. The control unit may receive commands to change modes, transmit data, switch components such as light source 606 on and/or off, switch on and/or off certain processes such as motion detection and/or speed monitoring, and/or initiation of a voice communication, to name a few. In another example, a sensor monitoring module 654 running on one or more processors of a control unit 602 may compare ambient temperature against stored threshold values. If a threshold is reached and/or exceeded, the control unit 602 may generate and/or transmit a message (e.g., SMS or other protocol) or other notification, e.g., via the communications system 608. Commands may be received from the communications system 608, e.g., via encoded SMS, via a mobile broadband network, and/or an IP network protocol, such as electronic messages over a data network (e.g., transmitted from a mobile application running on a user electronic device). Commands may also be received via a voice translation module using a microphone 615 for audio input.

The control unit 602 can receive, determine, and/or store electronic fence information, sensor data (e.g., temperature data, position data), and/or computed values (e.g., temperature variations, speed calculations), to name a few. Data may be stored in non-transitory computer-readable memory, which may be flash memory. Stored data can include device settings and/or threshold values for one or more properties (e.g., a speed value at which to provide an alert, maximum and/or minimum ambient temperatures at which to provide alerts, an ambient light value at which to activate and/or deactivate one or more light sources 606, and/or electronic fence data (e.g., boundary data), to name a few). The control unit 602 may calculate such computed values as temperature variations and/or speed calculations and/or may determine whether certain values exceed predefined thresholds.

Still referring to FIG. 6, a communications system 608 can comprise hardware such as one or more communications antenna 610 and/or a communications chipset 612. In embodiments, the communications chipset 612 may comprise one or more communications antennas 610, such as a GSM antenna, a Wi-Fi chip antenna, and/or a Bluetooth chip antenna, to name a few. One or more antennas 610 may be implemented in printed circuit board (PCB) copper. In embodiments, the antennas 610 may be external to the PCB to provide better reception and/or to save space and/or weight. A communications module 642 may be software running on one or more processors to control, process, and/or handle one or more aspects of communications (e.g., transcoding message data, generating transmissions, converting received data packets to electronic signals for producing an audio wave via a speaker 616, to name a few). The communications system 608 can perform communications using one or more communications protocols, as described herein, such as mobile broadband (e.g., LTE), GMS, and/or Bluetooth, to name a few.

An exemplary communications unit 104 can contain one or more physical connections for a communications system 608, such as a Quad Band GSM/GPRS unit and/or one or more antennas (e.g., a GSM antenna). The communications system 608 may be a quad band (850/900/1800/1900 MHz) GSM unit for worldwide application. In embodiments, a quint band (e.g., 450/850/900/1800/1900 MHz) may be used, which may provide greater connectivity for example, in more remote areas.

The communications system 608 can respond to SMS/GPRS commands with requested data and/or can alter its operation mode to a standby or low power state. Data can include a device ID, firmware version, sensor data (e.g., GPS data), computed values (e.g., speed data), battery power levels, and/or system status, to name a few. The communications system 608 can also provide approximate location data, which may be derived from nearby Wi-Fi or cellular networks. In embodiments, the approximate location information may be derived by querying an external database or from information pre-stored on the wireless device. In the latter case, signatures representing the availability of local Wi-Fi or cellular networks particular to specific locations (e.g., home, neighbor's house) may be stored and used to determine the location of the wireless device.

In embodiments, the communications unit 104 may transmit an alert message in response to several conditions, including low battery power, high or low ambient temperatures, violations of the electronic fence or speed settings, pressing of pre-programmed SOS button, and/or other preset trigger occurrences.

The communications unit 104 can include an audio system 614. The audio system 614 may comprise an audio input device such as a microphone 615, one or more audio output devices such as speakers 616, and/or sound generation circuitry 618. In embodiments, the audio system 614 may include an analog-to-digital converter, which may be used to convert audio input from the microphone 615 to electronic signals and/or data packets. An audio input module 644 may process the conversion of input audio data into electronic audio files that can be stored and/or into data packets that can be transmitted. The one or more speakers 616 may be operably connected to the sound generation circuit 618, which may process electronic audio signals to produce a sound by the speakers 616. An audio output module 646 may be a software module that processes the conversion of audio data files into electronic audio signals for producing sound at a speaker 616.

In embodiments, the communications unit 104 can store audio segment data 632, which may comprise audio segment files. Audio segment data 632 may be generated at the communications unit 104 (e.g., via the microphone 615 and analog-to digital converter). In embodiments, audio segment data 632 may be received by the communications unit 104, e.g., via a transmission received at the communications system 608 and/or via an upload via a physical connection such as a cable (e.g., from a user electronic device to the communications unit 104).

In operation, the communications unit 104 may enable remote broadcasting of various types of alerts from one or more internal speakers 616. Internal speaker 616 is preferably water resistant or waterproof. Communicated messages may include commands to a pet to return home or sit still. Communicated messages may include messages to passerby that the pet is lost and assistance is required. Communicated messages may be prerecorded. Without intending to be bound by theory, the present invention improves upon existing technology by allowing the pet owner to communicate remotely with the pet using their own voice either directly or through messages generated using the pet owner's voice.

Communicated messages may include a prerecorded or generated high frequency signal in the range of 15 kHz to 60 kHz. Preferably the high frequency signal is in the range of 23 kHz to 54 kHz and is audible to pets but inaudible to humans. A separate speaker optimized for high frequency output may be used for the high frequency signal.

The communications unit 104 can include a power system 620. The power system 620 can comprise one or more batteries 622 and/or a power supply circuit 624. The batteries 622 may be internal and/or external and/or may be removable. In embodiments, the communications unit 104 may be powered and under control of the control unit whenever batteries 622 are charged and attached. In embodiments, a power module 648 may handle power distribution throughout the communications unit 104 to the various electronic components. The power module 648 may place certain components in standby or low power mode and/or may withhold power from certain components. The power module 648 may place the entire communications unit 104 in a standby low power mode, e.g., in response to a received signal and/or in response to one or more determinations, such as a determination that there is no movement (e.g., such that the pet may be sleeping). The communications unit 104 can also monitor the battery levels of batteries 622, which levels may be indicated using one or more indicator light, such as a bi-colored monitor LED indicator for each battery 622.

The communications unit 104 can include a GPS receiver and/or related circuitry. The GPS receiver can determine position data corresponding to a position (e.g., geographic coordinates) of the communications unit 104. In embodiments, the GPS receiver can report location in an National Marine Electronics Association (NMEA) standard format if requested. The GPS receiver may be a subunit of the circuit board. It may be a single module or may be composed of individual electronic parts. It may be integrated onto a single chip with other units of the device, e.g., the communications system chipset and CPU. The GPS receiver in the device can incorporate Assisted GPS (A-GPS) so that time to first fix (TTFF) is very short, minimizing power usage. The GPS receiver may communicate with the communications system 608. A location module 650 may process position data (e.g., to determine the geographic coordinates), store position data, and/or perform calculations using the position data. Accordingly, a location module 650 may calculate a speed (e.g., an average speed based upon two position data points). In embodiments, a location module 650 may provide location monitoring to determine whether an electronic fence boundary was crossed. The location module 650 may evaluate location transmission rules data 634 to determine if and/or when to generate and/or transmit notifications related to position and/or speed data. For example, location transmission rules data 634 may identify one or more software electric fence boundaries (e.g., designating a house and/or its yard, designating a home location and/or an acceptable radius from the home location, and/or designating off-limits zones). In another example, if a pet is supposed to be walking, the communications unit 104 should not exceed speeds corresponding to a walking or running speed of the pet (e.g., no speeds corresponding to automobile transportation). Location transmission rules data 634 may also identify one or more notifications settings, such as contact information (e.g., an email address to contact, a phone number to call, a user device ID or user account ID for receipt of an electronic message), notification type information (e.g., phone call, SMS, email, mobile application push notification), and/or notification frequency information (e.g. receive alerts right away, wait predefined time before transmitting an alert, do not transmit alerts after 9 pm, to name a few).

A communications unit 104 can include one or more light sources 606, which, in embodiments, can comprise one or more LEDs. Light sources 606 may provide nighttime safety and/or visibility. Light sources 606 may help the pet see and/or may help a pet caretaker locate the pet at night. Light sources 606 may provide light in different colors (e.g., white light, yellow light, red light, to name a few). Light sources 606 may provide light in different intensities (e.g., bright light, dim light). In embodiments, light sources 606 may operate in one or more modes, such as steady light, flashing, strobing, focused beam, and/or dispersed beam, to name a few. A lighting module 652 may control the operation of the one or more light sources 606, e.g., to switch the lights on and/or off, to change the mode, to change the intensity, and/or to change the color. In embodiments, a lighting module 652 may communicate with a sensor module 654, to adjust the light sources 606 in response to a determination that ambient light has reached a threshold value. In embodiments, light sources 606 may be controlled in response to signals transmitted from a user device (e.g., a mobile phone), which may be relayed by a cellular data network provider and/or Internet service provider.

A communications unit 104 can include one or more sensors 626, such as accelerometers, speed sensors, motion sensors, temperature sensors, light sensors, noise sensors, dog bark sensors, heart rate monitors, to name a few. Sensors 626 may be operably connected to the control unit 602 of the communications unit 104, which can send an electronic notification and/or message via the communications system 608 when a sensor data value falls outside parameters that are predefined or provided by the owner. Sensor data may be transmitted and/or reported (e.g., to a user device and/or to one or more servers, such as a social media server). Transmission may be continuous, periodic (e.g., on a fixed schedule, such as every 5 minutes, twice a day, at 5 pm, to name a few), and/or upon request. A sensor module 654 may monitor the sensor data 636, compare it against threshold values, computer derivative data (e.g., speed computed from position data), and/or compare the derivative data against threshold values. The sensor module 654 may trigger alerts, generate electronic messages, and/or pass electronic messages to the communication system 608 to send to one or more other entities (e.g., a user device).

In embodiments, a communications unit 104 can contain additional hardware, such as SIM cardholder and SIM card, EEPROM, control microcontroller, cameras, video cameras, and/or I/O connectors, to name a few. In embodiments, one or more hardware components may be provided on one printed circuit board (PCB). The communications unit 104 can have an electronic key function to open locked pet or human doors. Unlocked pet doors can allow unwanted wildlife or persons to enter the home. The communications unit 104 may automatically open a lock when it comes within a few feet of the locked door. The communications unit 104 may be configured to unlock doors only for entry and/or exit or may be configured to unlock doors only during specific time windows. For human doors, the electronic key can be enabled by voice and/or wireless communication from the pet owner.

FIGS. 3A-H illustrate various views of an alternative exemplary embodiment of a wearable communications device 300 for a pet.

Figure 3A:
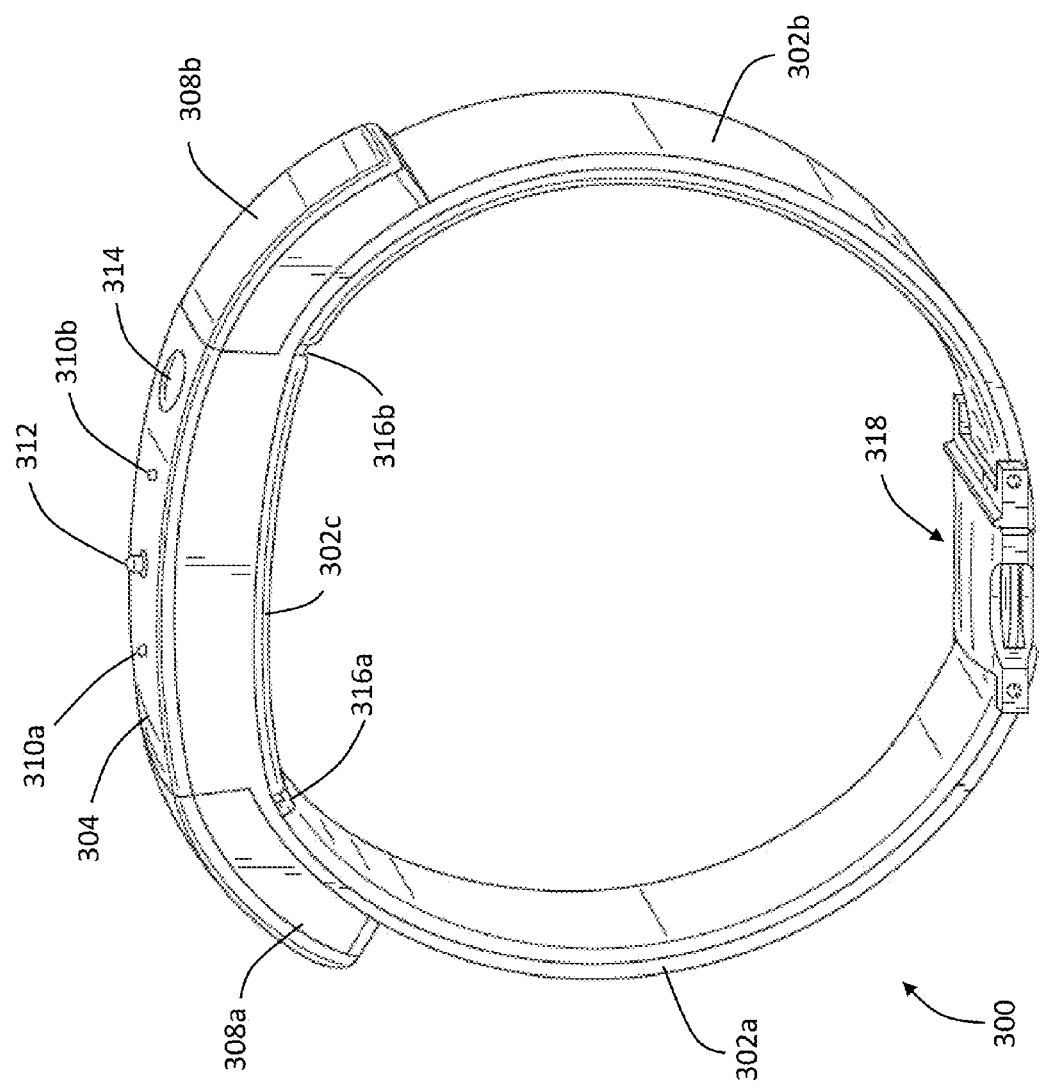
FIG. 3A is a perspective view of a wearable communications device according to an exemplary embodiment of the present invention.

FIG. 3A is a perspective view of the wearable communications device 300. The device can include a band 302, which may comprise a first side band section 302*a*, a second side band section 302*b*, and a top band section 302*c*. Together, band sections 302*a*, 302*b*, and 302*c* may form a closed loop, where an end of the side band sections 302*a* and 302*b* are fastenable to each other via fastener 318, which may be a buckle. Hinges 316*a* and 316*b* may connect side band sections 302*a* and 302*b*, respectively, to the top band section 302*c*, and may enable the side band sections to pivot about an axis normal to the loop formed by the band sections so as to facilitate removing the wearable communications device from the pet and/or to provide a snug and/or adjustable fit around the neck of the pet.

The wearable communications device 300 can also include a communications unit 304, which may comprise one or more removable batteries, e.g., removable batteries 308*a* and 308*b*. As described with respect to batteries 108*a* and 108*b* of FIG. 1, the batteries may be rechargeable, and the device 300 may be operable with only one battery. The body of the communications unit 304 can house one or more processors, circuitry, sensors, and hardware such as speakers. The body can also include a display and/or one or more light sources 310 (e.g., 310*a* and 310*b*). In embodiments, the light sources may comprise one or more LEDs. The light sources may be responsive to a light sensor integrated into the device, which can cause the lights to turn on when ambient light is low and/or turn off when there is a threshold amount of ambient light. In embodiments, the light sources 310 may be remotely controlled, e.g., via inputs at a user electronic device, to turn the lights on and/or off and/or to change the mode of the lights (e.g., steady, flashing, strobing). An indicator light 312 may provide notifications, alerts, statuses, and/or indications of operating modes of the communications unit 304. As described with respect to FIG. 1A, the communications unit 304 may include a pre-programmed transmission button 314.

Figure 3B:
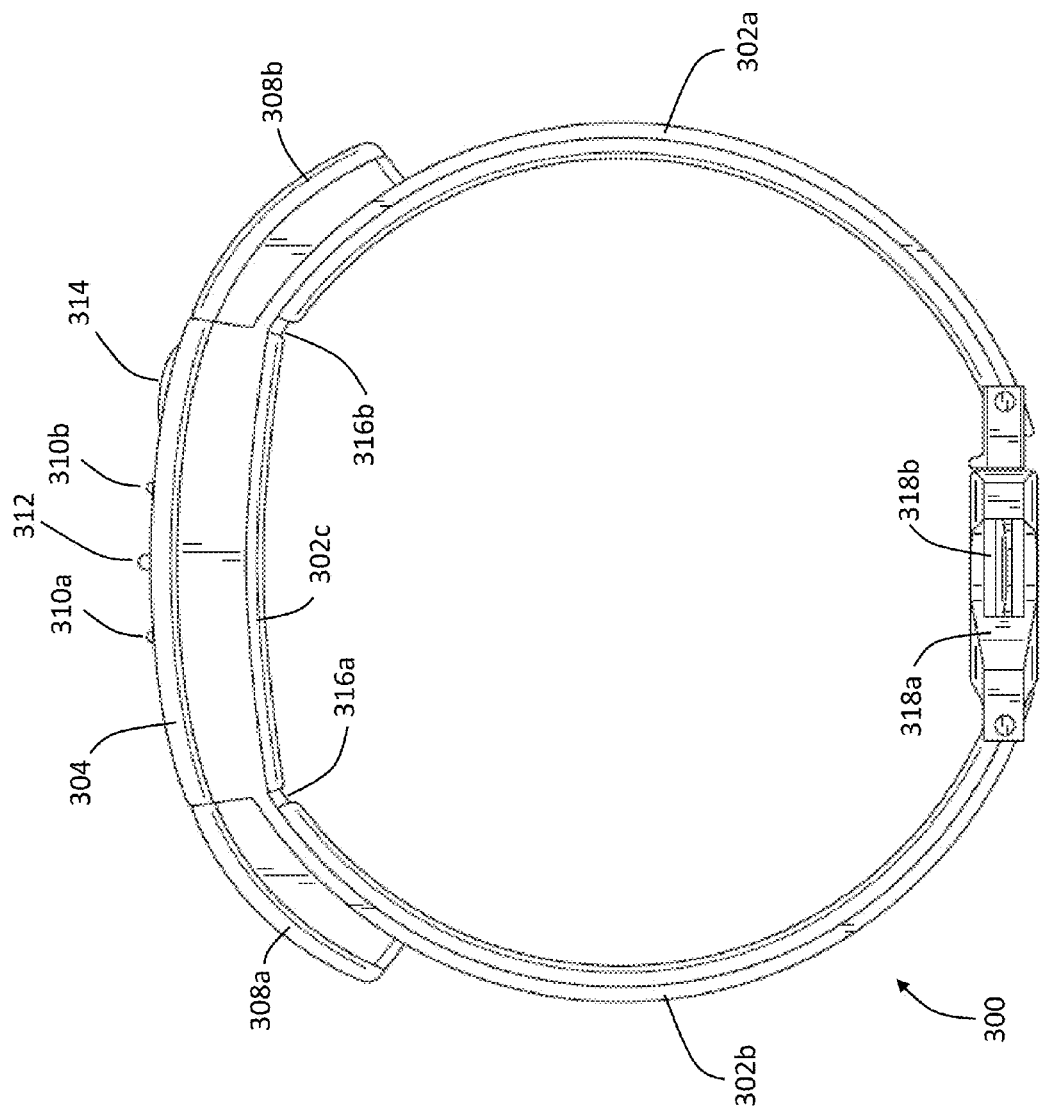
FIGS. 3B-C are profile views of a wearable communications device according to an exemplary embodiment of the present invention.
Figure 3C:
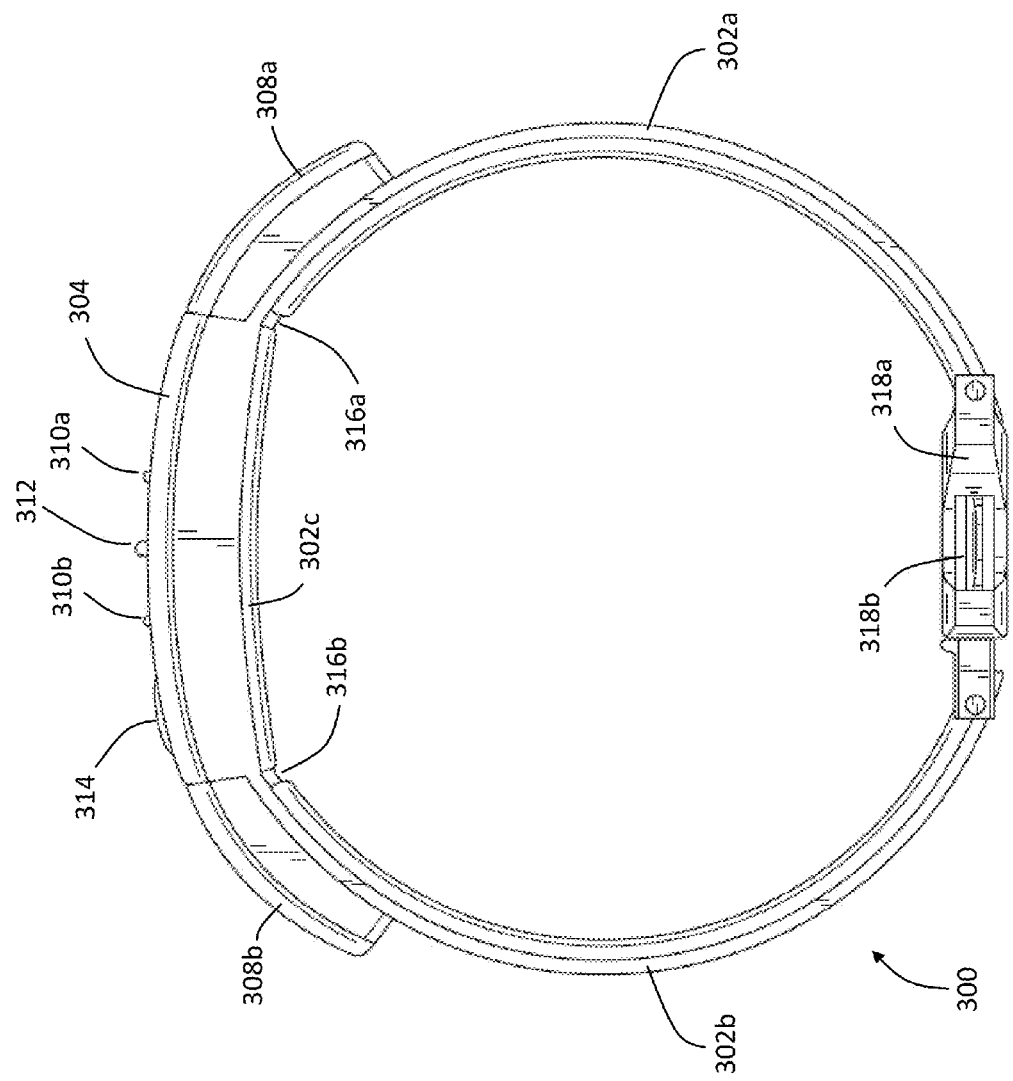
Figure 3D:
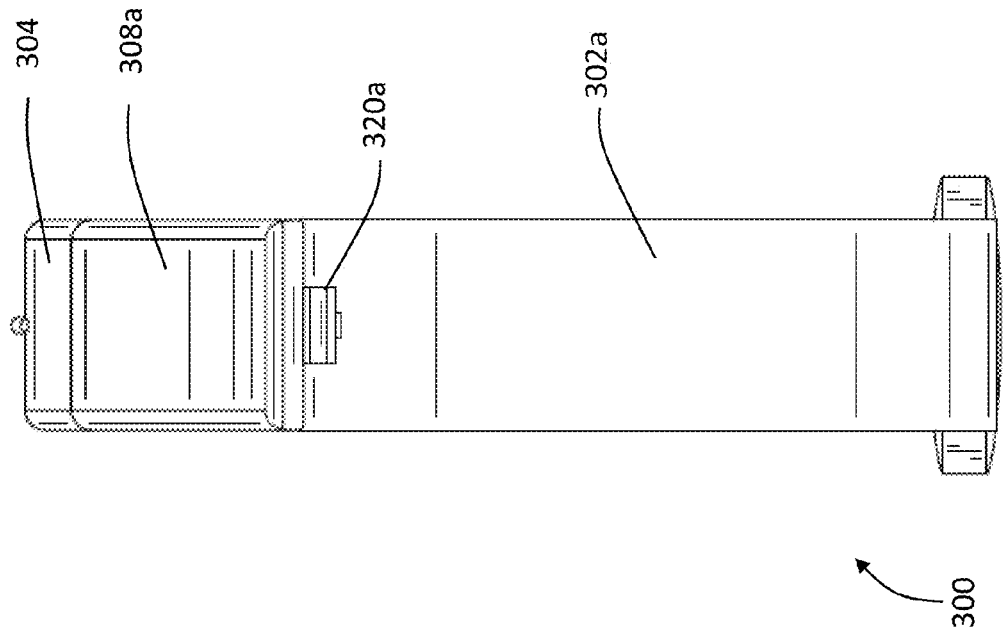
FIGS. 3D-E are side views of a wearable communications device according to an exemplary embodiment of the present invention.
Figure 3E:
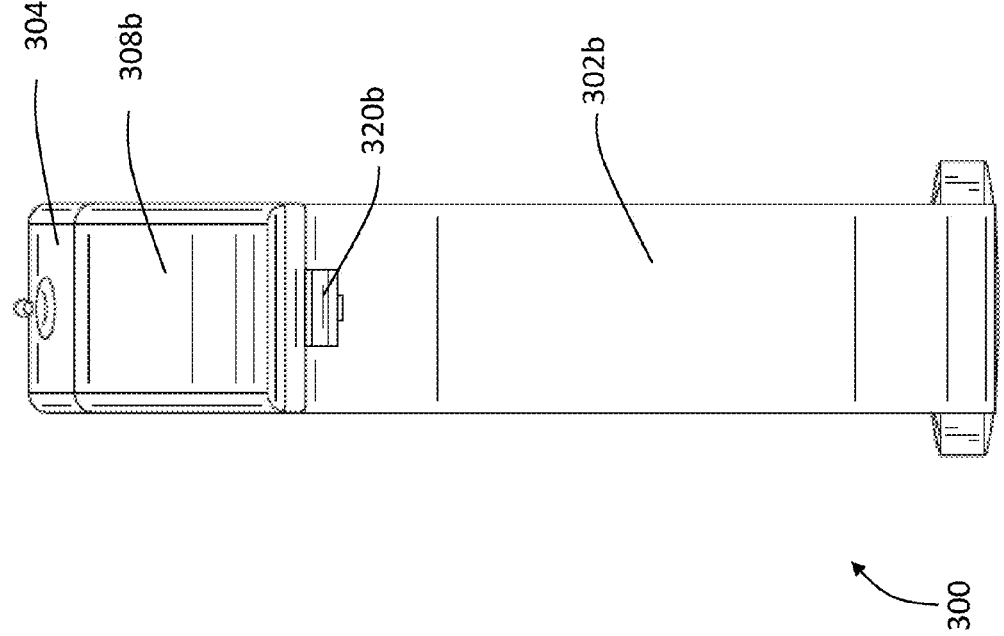
Figure 3F:
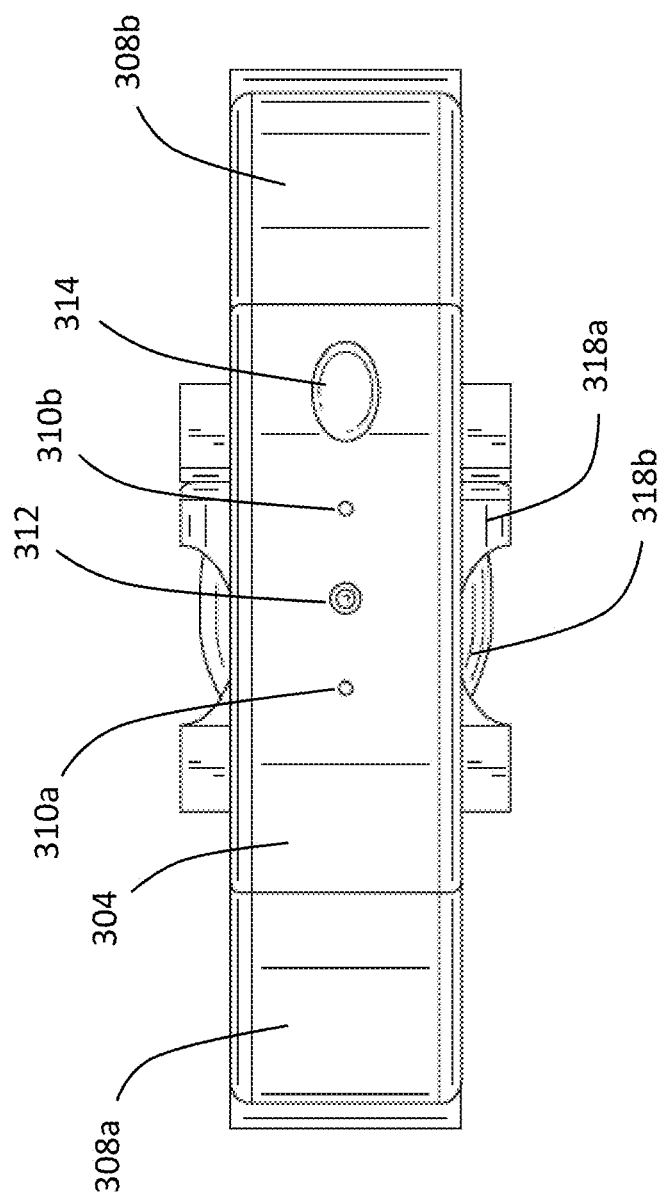
FIG. 3F is a top view of a wearable communications device according to an exemplary embodiment of the present invention.
Figure 3G:
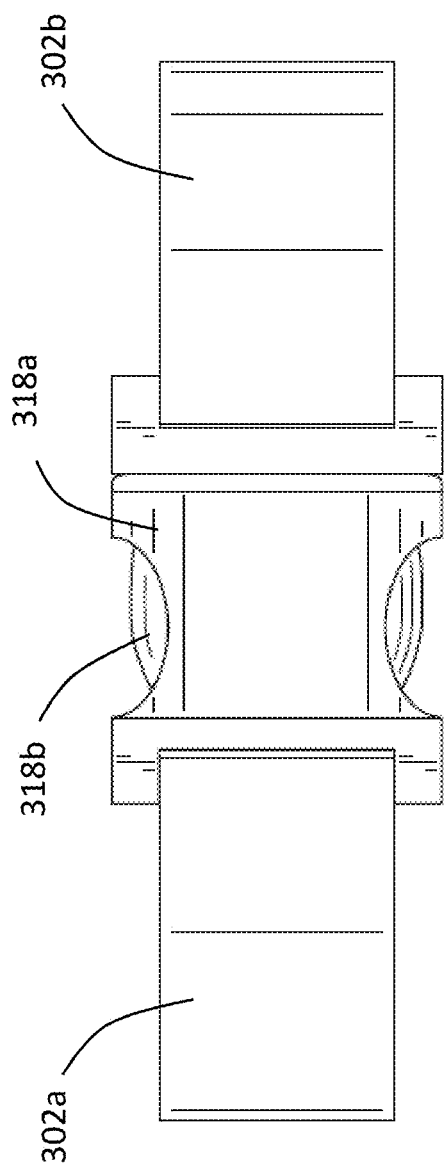
FIG. 3G is a bottom view of a wearable communications device according to an exemplary embodiment of the present invention.

FIGS. 3B-C illustrate profile views of the wearable communications device 300, while FIGS. 3D-E illustrate side views. FIG. 3F is a top view of the wearable communications device 300, FIG. 3G is a bottom view showing the fastener 318, and FIG. 3H is an exploded view. As seen in FIG. 3H, the fastener comprises two components, female end 318*a* and male end 318*b*, which may in turn comprise a plurality of male ends. The male end 318*b* can be inserted into the female end 318*a* to close the loop of band 302. FIG. 3G shows the fastener 318 in a fastened state.

FIGS. 4A-H illustrate various views of a wearable communications device according to an alternative exemplary embodiment of the present invention.

FIG. 4A shows a perspective view of a wearable communications device 400. A leash attachment 424 may be one or more holes or loops to which a leash may clip to the wearable communications device 400. In embodiments, the leash attachment 424 may be located on the body of the communications unit 404. In other embodiments, the leash attachment 424 may be located along the band 402.

Figure 4B:
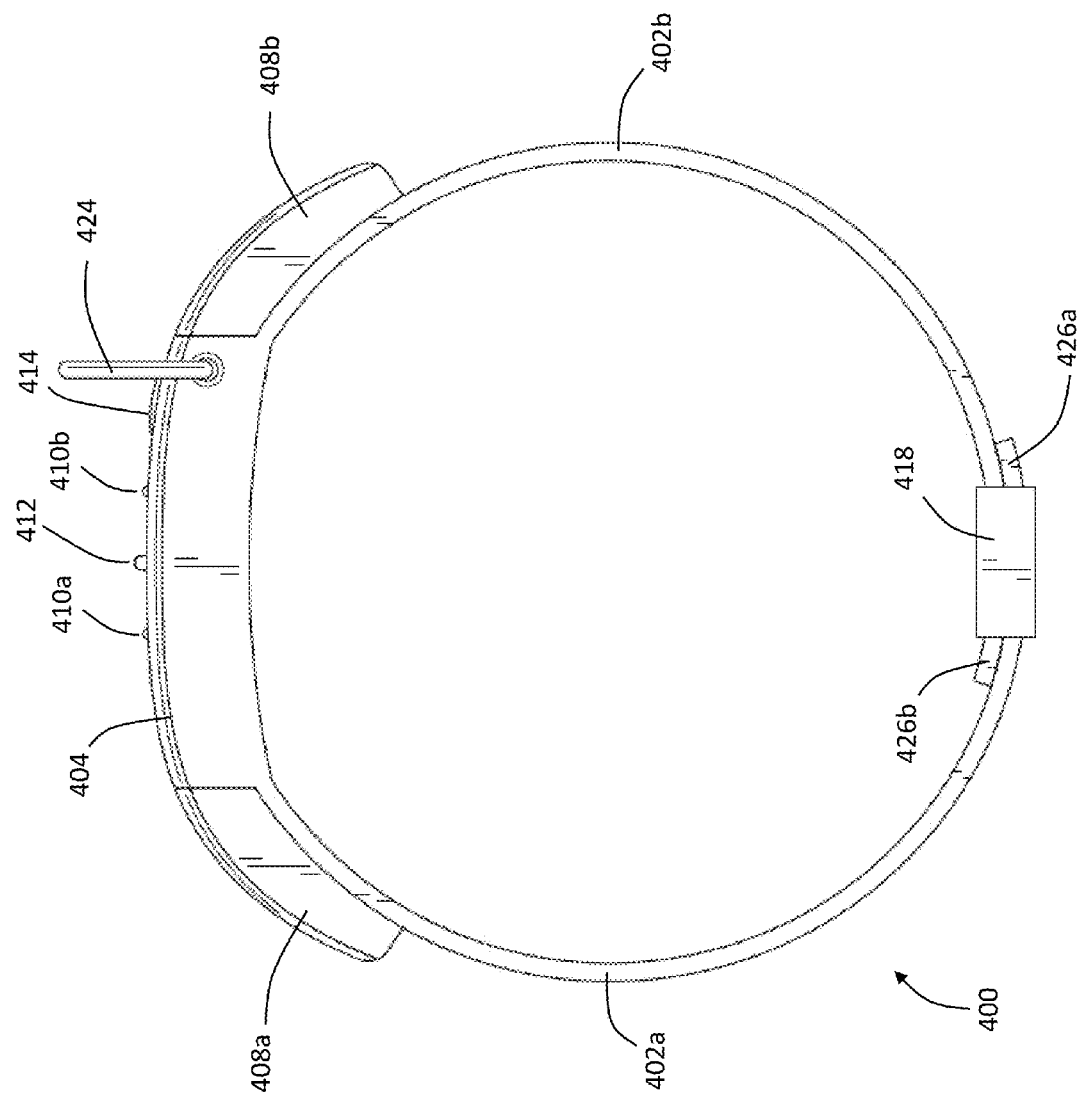
Figure 4F:
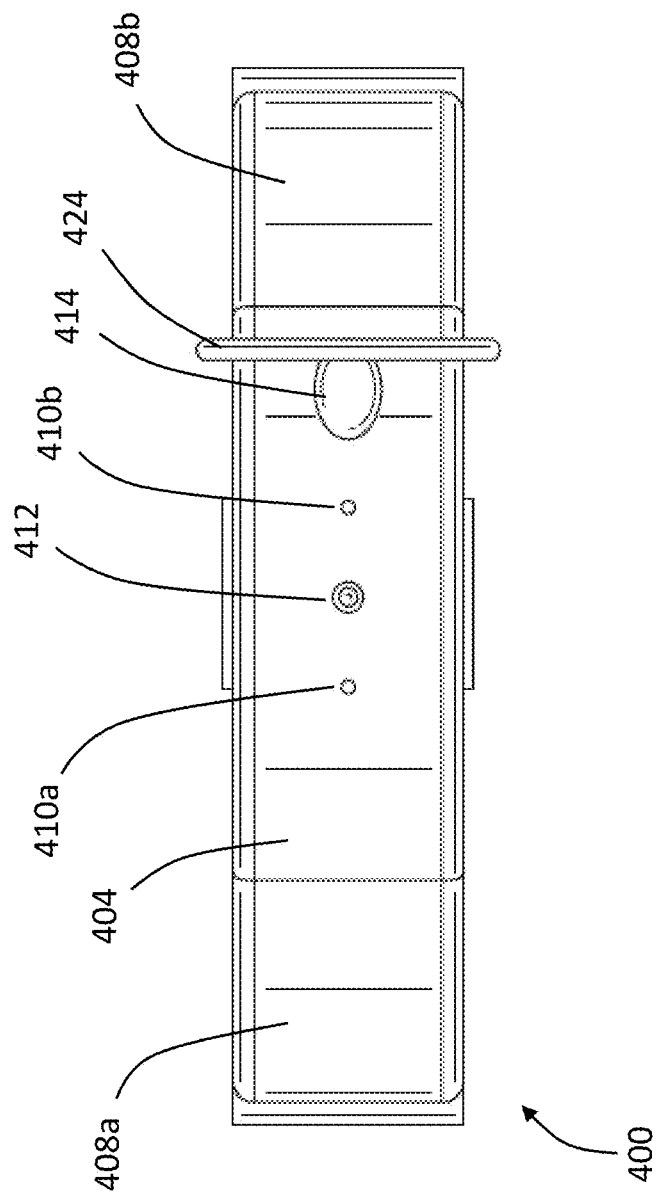
FIG. 4F is a top view of a wearable communications device according to an exemplary embodiment of the present invention.

FIGS. 4B-C show profile front and back views, and FIGS. 4D-E show side views of the wearable communications device 400. FIG. 4F illustrates a top view of the wearable communications device 400, and FIG. 4G illustrates a bottom view. FIG. 4H is an exploded view of the wearable communications device 400.

Figure 5:
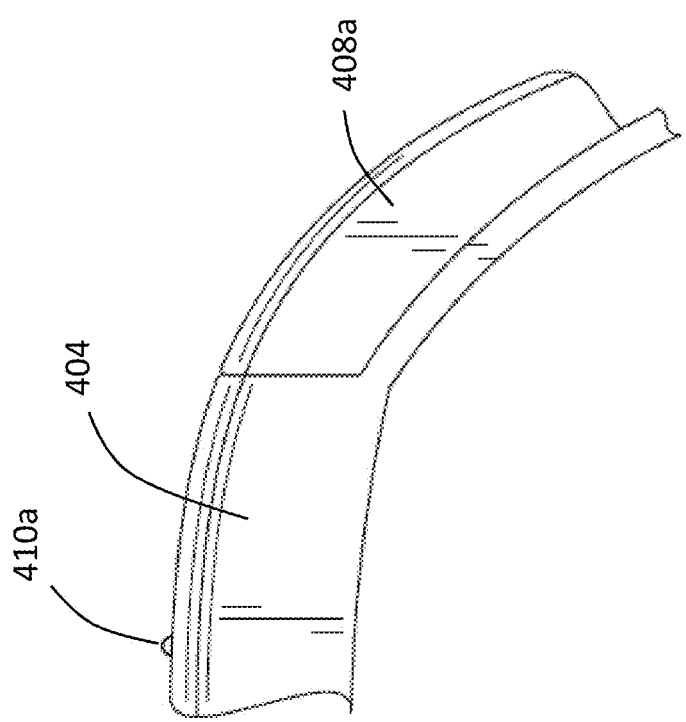
FIG. 5 is a front view of a battery coupled with a circuit compartment of a wearable communications device according to an exemplary embodiment of the present invention.

FIG. 5 is a front view of a battery coupled with a circuit compartment of a wearable communications device according to an exemplary embodiment of the present invention. Battery 408*a* may comprise a curved and/or elongate body that aligns with a curved bottom portion of communications unit 404.

Figure 7A:
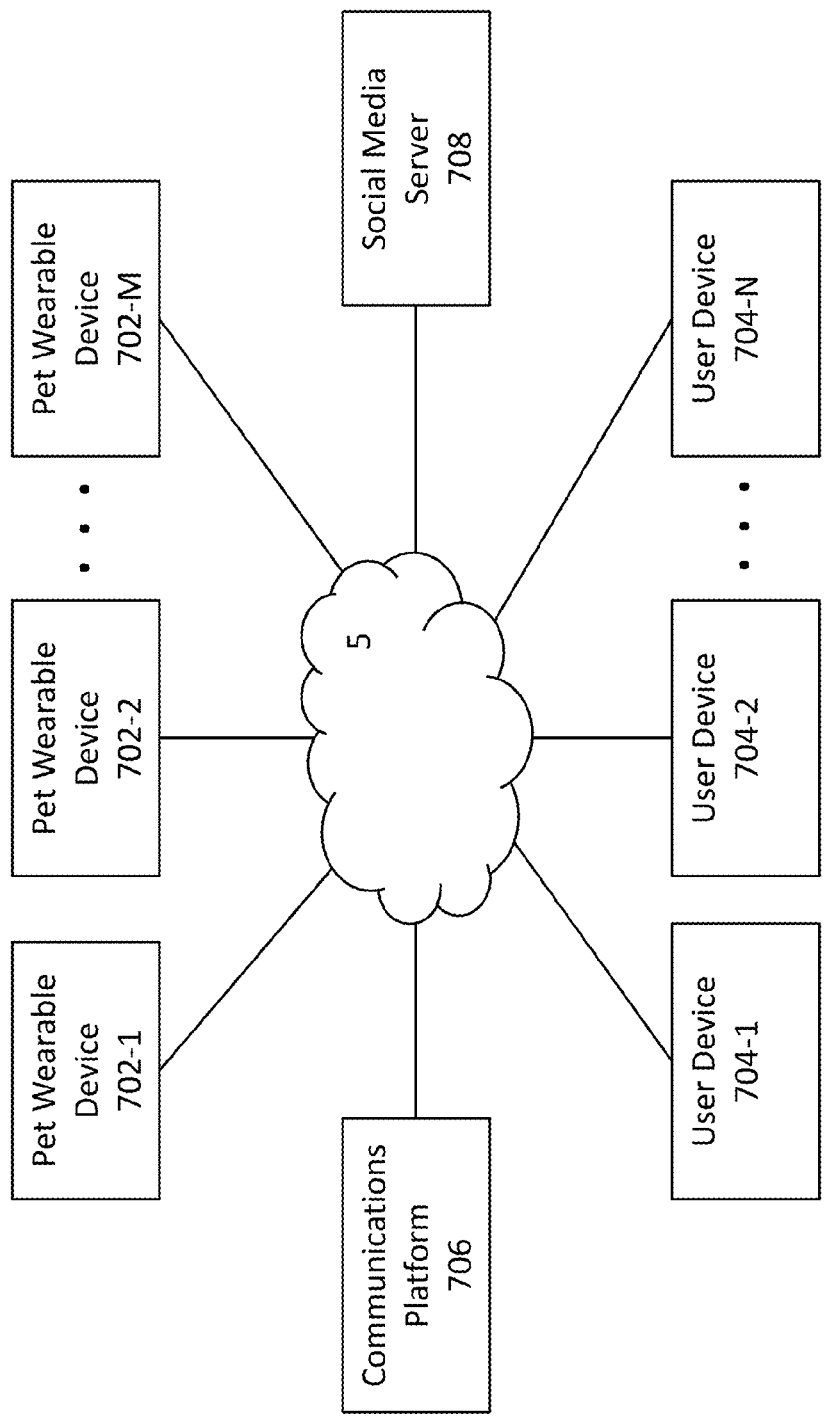
FIG. 7A is a schematic diagram of a wearable device communication system in accordance with exemplary embodiments of the present invention.

FIG. 7A is a schematic diagram of a wireless device system with connectivity to a social media network in accordance with exemplary embodiments of the present invention. The system can include one or more wireless communications devices, such as pet wearable devices 702 (e.g., 702-1, 702-2, . . . , 702-M), one or more user devices 704 (e.g., 704-1, 704-2, . . . , 704-N), one or more communications platforms 706, and/or a social media server 708. Any of the entities participating in such a system can own, operate, manage, and/or use one or more user devices and/or computer systems, which can include one or more processors, software operating on the one or more processors, data stored in databases on non-transitory computer-readable memory, input devices, and/or display devices, to name a few.

The devices and/or computers in a wireless device system can also include one or more communications systems, which may handle, process, support, and/or perform wired and/or wireless communications. Communications systems can comprise hardware (e.g., hardware for wired and/or wireless connections) and/or software. In embodiments, communications systems can include one or more communications chipsets. Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1×RTT, Ev-DO, HSPA, UMTS, 3G, 4G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, T1 interfaces, and/or antennas, to name a few. The components in a wireless device system may be connected directly and/or indirectly, e.g., through a data network 5, such as the Internet, a telephone network, a mobile broadband network (such as a cellular data network), a mesh network, Wi-Fi, WAP, LAN, and/or WAN, to name a few.

A pet wearable device 702 may be a wireless communications device as described herein. It may communicate with via other system components via an external data network 5, such as the Internet, or may directly communicate with a user device 704 (e.g., via Bluetooth).

A user device 704 may be a computer, tablet computer, wearable computer, mobile phone, smart phone, PDA, remote control, or other user electronic device. Such a device an include one or more input devices, such as microphones, keyboards, mice, touch screens, and/or cameras, to name a few, and one or more output devices, such as display screens and/or speakers.

A communications platform 706 may comprise one or more computers, communications relay equipment, and/or communications antennas for receiving, routing, relaying, and/or transmitting communications, such as data packets. A communications platform 706 may be operated by a cellular network provider and/or by an Internet service provider.

A social media server 708 may comprise one or more computers configured to provide access to and/or interconnectivity with a social media network. Social media networks and related program products may be configured to facilitate communication between users substantially in real-time, which can connect pet owners and/or pet enthusiasts, e.g., in the same geographic region. A pet social media network can provide alerts for lost pets.

Figure 7B:
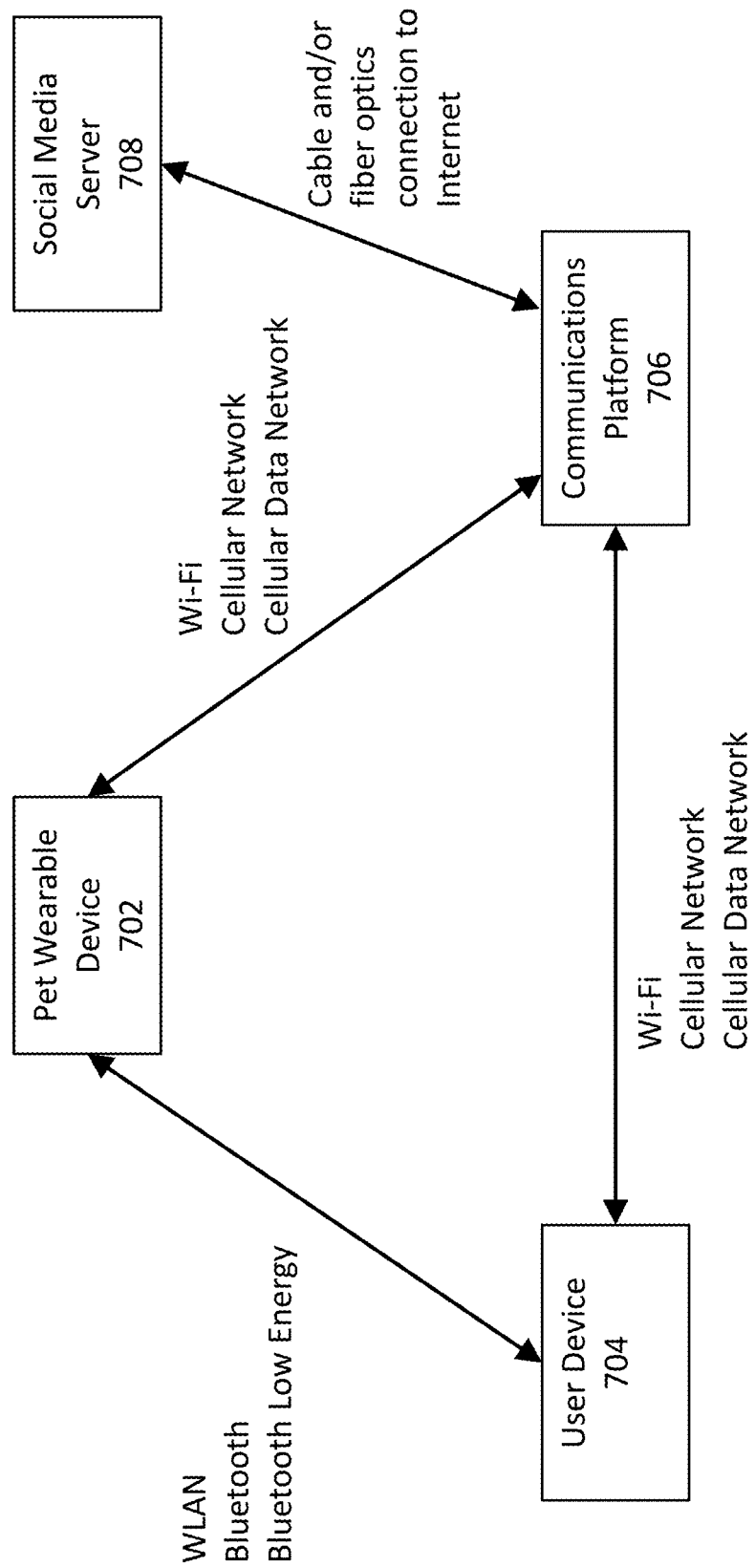
FIG. 7B is a schematic diagram of communication paths in a wearable device communication system in accordance with exemplary embodiments of the present invention.
Figure 8:
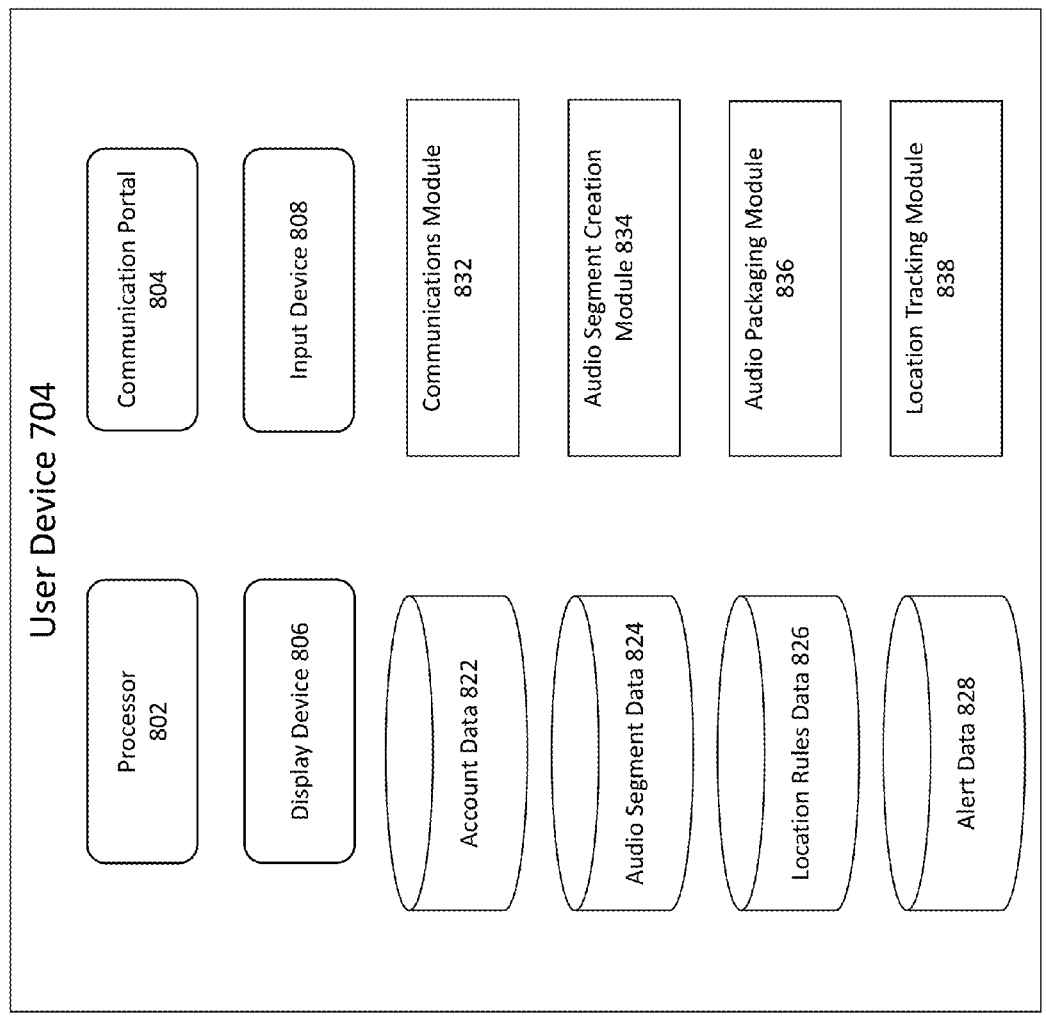
FIG. 8 is a schematic diagram of a user device in accordance with exemplary embodiments of the present invention.

FIG. 7B is a schematic diagram of exemplary communication paths in an exemplary wireless system. Communicating can comprise sending and/or receiving data (e.g., data packets). In embodiments, any of the components in the system may communicate with each other or with third party systems through a data network, such as the Internet. Communications may be relayed through intermediaries, such as a communications platform 706. System components may also communicate directly using one or more communication protocol. A wireless communications device such as a pet wearable device 702 may communicate with a user device 704 via WLAN, Bluetooth, and/or Bluetooth Low Energy. The pet wearable device 702 may also communicate with a communications platform 706 via an external data network such as the Internet, which may be accessed via Wi-Fi provided by a wireless router, via a mobile broadband network, which may be a cellular data network (e.g., UMTS 3G or LTE), and/or via a cellular network. Similarly, the user device 704 may communicate with the communications platform 706 via Wi-Fi, via a cellular network, and/or via a cellular data network. In embodiments, a user device 704 may communicate with a communications platform 706, in order to transmit messages to and/or effect changes at a pet wearable device 702. Accordingly, the communications platform 706 may relay and/or generate and send communications to the pet wearable device 702. The communications platform 706 may access the Internet through a wired data connection (e.g., cable and/or fiber optics) and/or a wireless data connection, such as Wi-Fi. Accordingly, the communications platform 706 may connect to one or more social media servers 708, which may be accessible via the Internet at a URL.

In embodiments, a system for communicating with a wearable communications device can comprise an electronic user device 704 comprising one or more first processors, a first communications chipset, and first non-transitory computer-readable memory having stored thereon first machine-readable instructions for transmitting using the first communications chipset pre-recorded audio segment files and second machine-readable instructions for receiving, using the first communications chipset, location data packets. The system can further comprise a wearable communications device 702 comprising a fastenable band, one or more removable batteries, a GPS receiver, one or more second processors, a second communications chipset configured to transmit the location data packets and to receive the pre-recorded audio segment files. The system can also comprise a communications platform 706 configured to relay via first wireless communications the pre-recorded audio segment files from the electronic user device 704 to the wearable communications device 702 and further configured to relay via second wireless communications (e.g., cellular data transmissions) the location data packets from the wearable communications device 702 to the electronic user device 704. In embodiments, the location data packets can comprise location information for the wearable communications device 702, which data packets may be generated based at least in part upon data from the GPS receiver. In embodiments, the audio segment files may be transmitted as data packets.

The mobile notification system may monitor one or more of the following conditions: (1) the geographic location of the device, using cellular triangulation, Wi-Fi frequencies (when available), or GPS satellite signals; (2) the ambient temperature near the device, or in some iterations, the heart rate of the wearer of the device; (3) the speed of the device, if it is moving; and/or (4) the battery charge status, to name a few. In the event that any of these parameters (which may be pre-programmed) are violated, the device and its system may automatically send a message to a user device (e.g., associated with an owner of the wearable device, such as a pet owner) notifying them of the current status or circumstance.

Figure 12C:
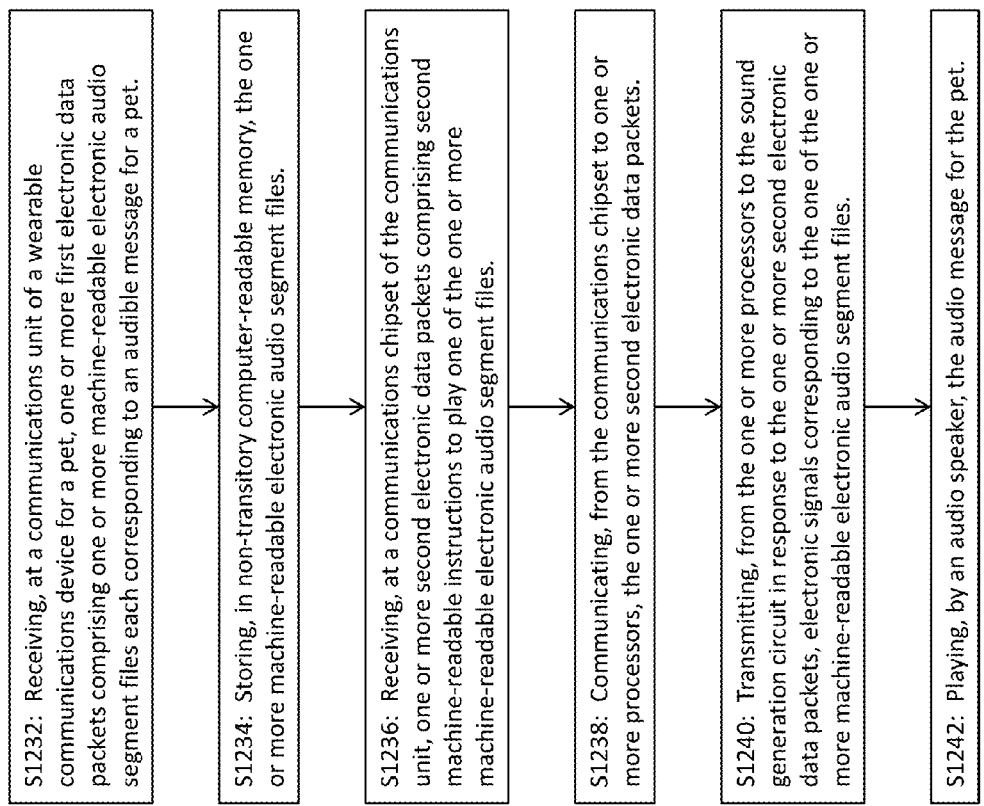

FIGS. 12A-C are flow charts of exemplary processes for providing audio messages at a wearable communications device in accordance with exemplary embodiments of the present invention. These processes may be performed by the components of a communications unit of a wearable communications device.

Referring to FIG. 12A, in a step S1202, a communications chipset of a wearable communications device for a pet may receive one or more electronic data packets comprising a machine-readable electronic audio segment file.

In a step S1204, the communications chipset may communicate to one or more processors, the one or more electronic data packets.

In a step S1206, the one or more processors may convert the one or more electronic data packets into electronic signals that cause an audio speaker to play a corresponding audio message for the pet.

In a step S1208, the one or more processors may transmit to a sound generation circuit, the electronic signals.

In a step S1210, the audio speaker may play the corresponding audio message for the pet.

Accordingly, a wearable communications device for a pet can comprise a band with fastenable ends having an elongated body portion corresponding to the neck of the pet, and a communications unit attached to the band, the communications unit. The communications unit can comprise a communications chipset; one or more processors operably connected to the communications chipset; a sound generation circuit comprising an audio speaker, the sound generation circuit operably connected to the one or more processors; one or more removable batteries providing power to the communications unit; and non-transitory computer-readable memory having stored thereon machine-readable instructions configured to perform the steps of receiving, at the communications chipset, one or more first electronic data packets comprising a machine-readable electronic audio segment file; communicating, from the communications chipset to the one or more processors, the one or more first electronic data packets; converting, by the one or more processors, the one or more first electronic data packets into first electronic signals that cause the audio speaker to play a corresponding first audio message for the pet; transmitting, from the one or more processors to the sound generation circuit, the first electronic signals; playing, by the audio speaker, the corresponding first audio message for the pet.

Referring to FIG. 12B, in a step S1222, a communications chipset of a wearable communications device for a pet may receive one or more electronic data packets comprising a text message corresponding to an audio message for the pet.

In a step S1224, one or more processors may transcode the text message into electronic signals corresponding to the audio message.

In a step S1226, the one or more processors may transmit to the sound generation circuit the electronic signals.

In a step S1228, the audio speaker may play the audio message for the pet.

Referring to FIG. 12C, in a step S1232, a communications unit of a wearable communications device for a pet may receive one or more first electronic data packets comprising one or more machine-readable electronic audio segment files each corresponding to an audible message for a pet.

In a step S1234, the one or more machine-readable electronic audio segment files may be stored in non-transitory computer-readable memory.

In a step S1236, a communications chipset of the communications unit may receive one or more second electronic data packets comprising second machine-readable instructions to play one of the one or more machine-readable electronic audio segment files.

In a step S1238, the communications chipset may communicate to one or more processors, the one or more second electronic data packets.

In a step S1240, the one or more processors may transmit to the sound generation circuit in response to the one or more second electronic data packets electronic signals corresponding to the one of the one or more machine-readable electronic audio segment files.

In a step S1242, an audio speaker may play the audio message for the pet.

Figure 13:
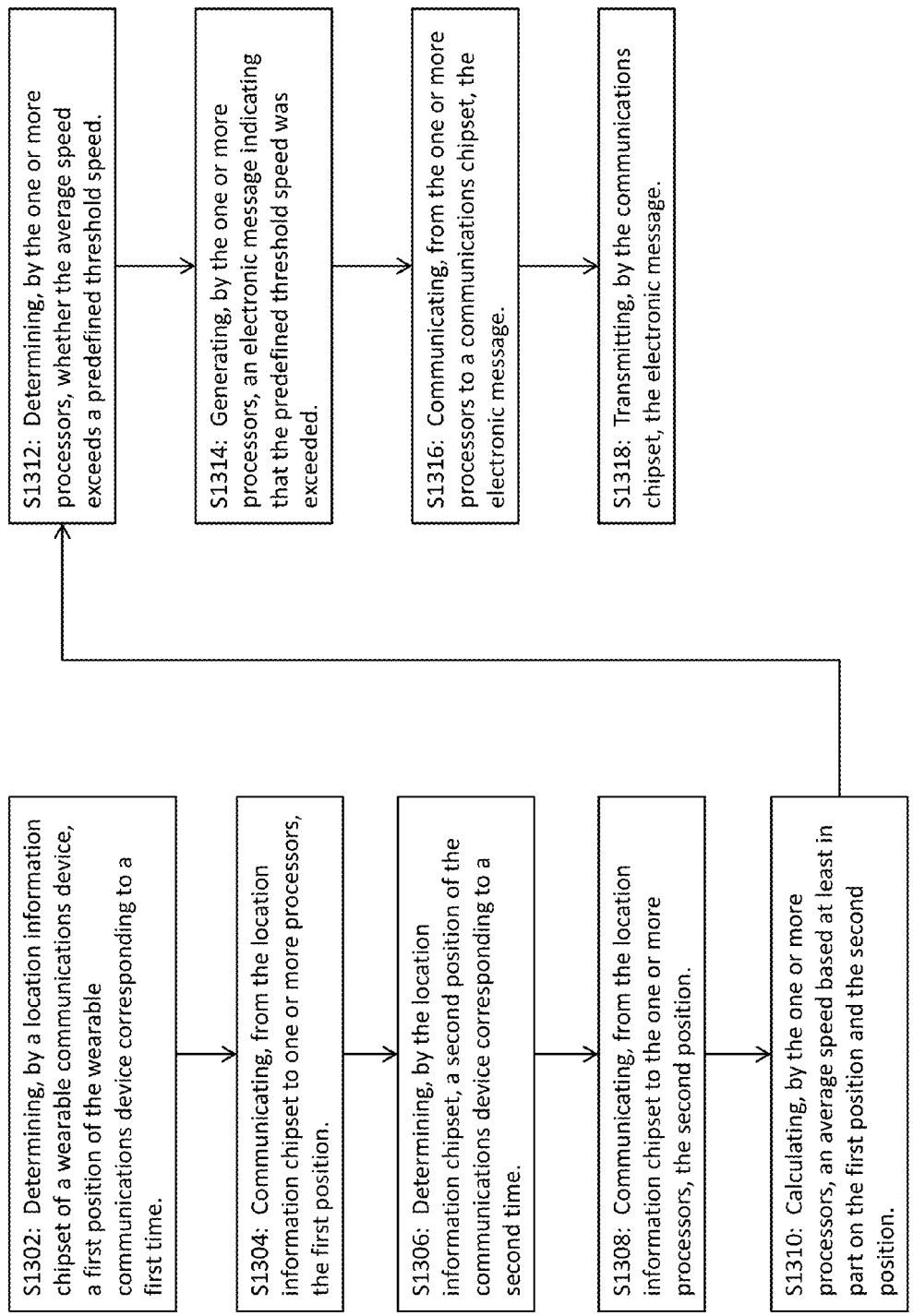
FIG. 13 is a flow chart of an exemplary process for transmitting location information from a wearable communications device in accordance with exemplary embodiments of the present invention.

FIG. 13 is a flow chart of an exemplary process for monitoring the position and/or speed of a wearable communications device in accordance with exemplary embodiments of the present invention. These processes may be performed by the components of a communications unit of a wearable communications device.

In a step S1302, a location information chipset of a wearable communications device may determine a first position of the wearable communications device corresponding to a first time.

In a step S1304, the location information chipset may communicate to one or more processors the first position.

In a step S1306, the location information chipset may determine a second position of the communications device corresponding to a second time.

In a step S1308, the location information chipset may communicate to the one or more processors the second position.

In a step S1310, the one or more processors may calculate an average speed based at least in part on the first position and the second position.

In a step S1312, the one or more processors may determine whether the average speed exceeds a predefined threshold speed.

In a step S1314, the one or more processors may generate an electronic message indicating that the predefined threshold speed was exceeded.

In a step S1316, the one or more processors may communicate to a communications chipset, the electronic message.

In a step S1318, the communications chipset may transmit the electronic message. In embodiments, the electronic message may comprise location information (e.g., GPS coordinates) associated with a location of the wearable communications device.

FIGS. 9A-F are screen shots of exemplary user device interfaces for participating in a wearable device communication system in accordance with exemplary embodiments of the present invention.

Figure 9B:
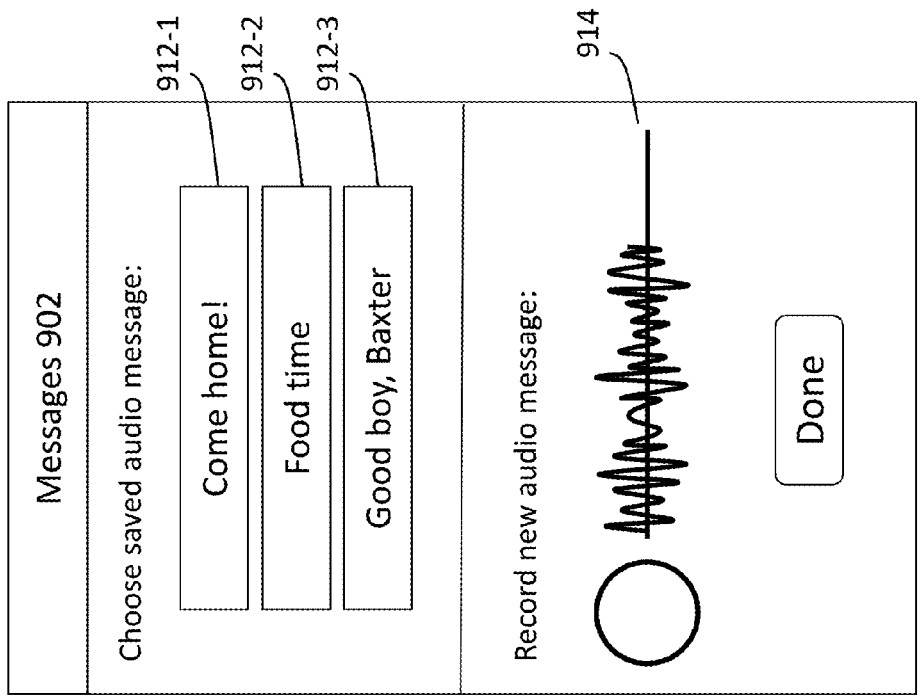
FIGS. 9A-F are screen shots of exemplary user device interfaces for participating in a wearable device communication system in accordance with exemplary embodiments of the present invention.
Figure 9A:
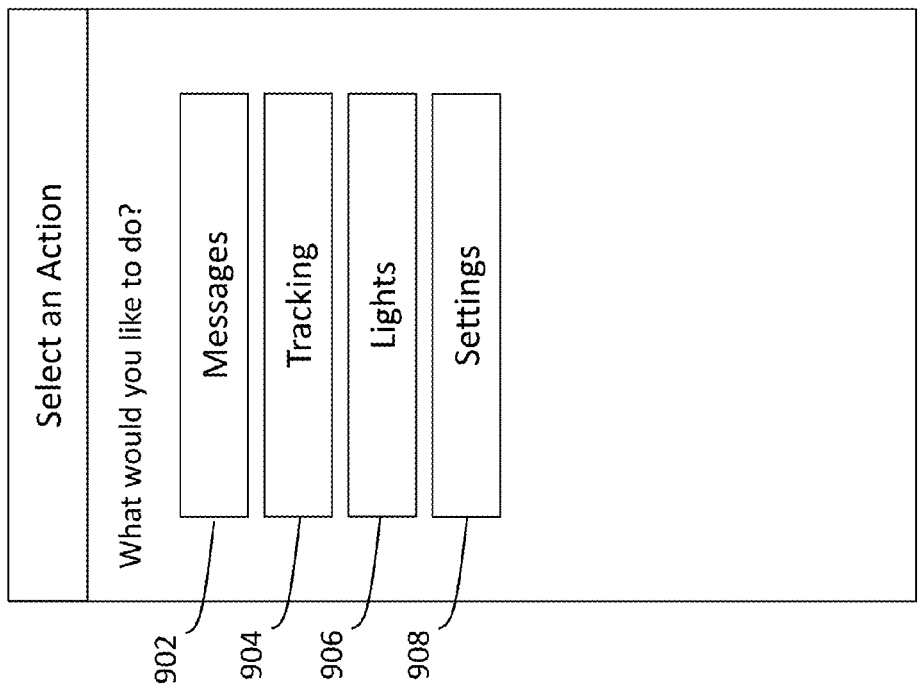

FIG. 9A illustrates a main menu graphical user interface for selecting an interface for actions related to a pet wearable device. Actions may relate to messages 902, tracking 904, lights 906, and/or settings 908.

FIG. 9B illustrates a menu interface for messages 902. A user can select a pre-recorded message 912, which may be stored in non-transitory computer-readable memory at the user device, at a remote server, and/or at the communications unit of a pet wearable device. The pre-recorded message 912 may have been recorded by the user (e.g., the pet owner) in the user's own voice. In embodiments, pre-recorded messages 912 may have a length limit. The messages 902 interface may provide a new message interface 914 for recording a new audio message.

Figure 9D:
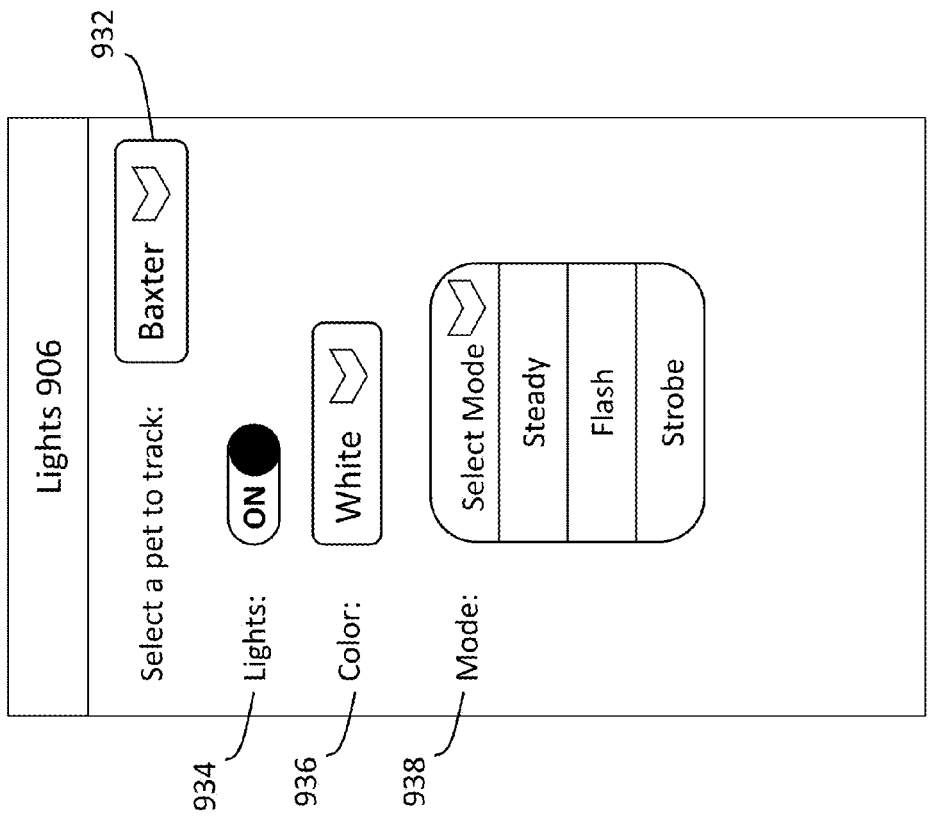
Figure 9C:
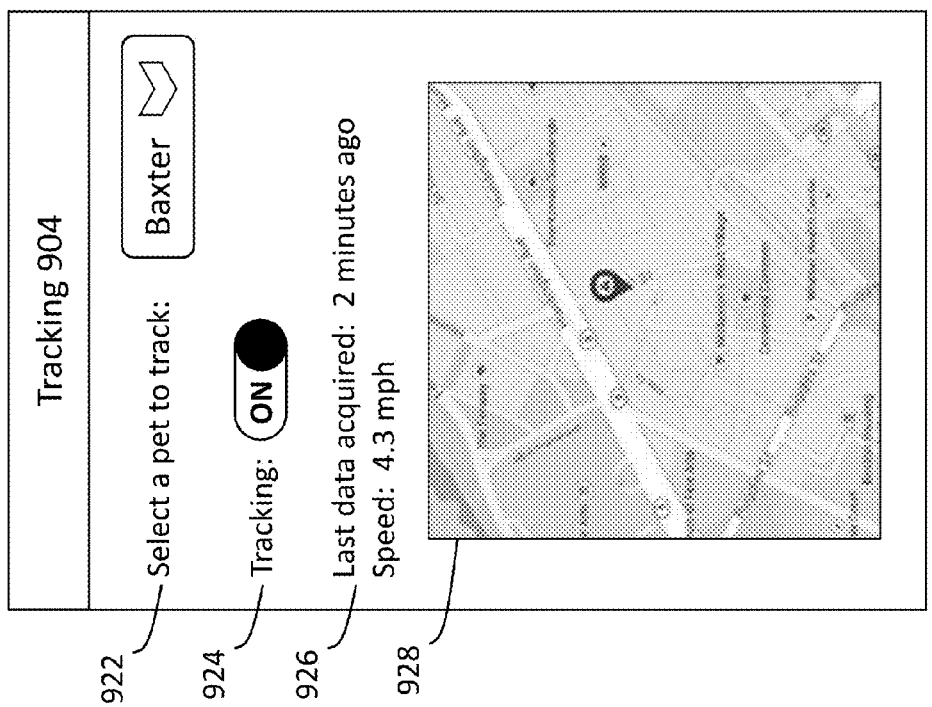

FIG. 9C shows an exemplary tracking interface 904. The interface can include a pet selection option 922 for choosing a pet to track, where more than one pet with a pet wearable device is associated with the same user device. Tracking data may be toggled on and/or off via a tracking option 924. Tracking data 926 may indicate the time at which data was last acquired, a speed, and/or coordinates associated with the position of the communications unit of the pet wearable device of the selected pet. A map 928 may provide a visual map of the device's position, path of previous positions, and/or overview of the surrounding area.

FIG. 9D shows a lights interface 906. The interface may provide a pet selection option 932. The interface can include a lights option 934 for remotely toggling lights on and/or off on a pet wearable device. A color selection option 936 may be used to control the color of the lights, and a lights mode 938 may enable a user to select a mode of operation for the lights (e.g., steady light, flashing light, and/or strobing light).

Figure 9F:
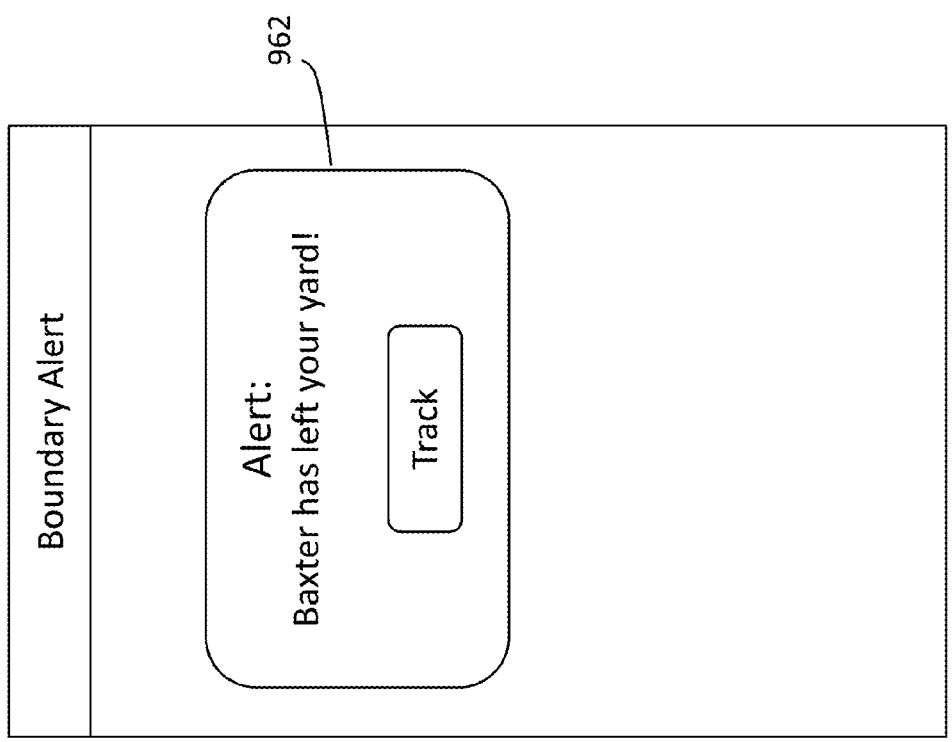
Figure 9E:
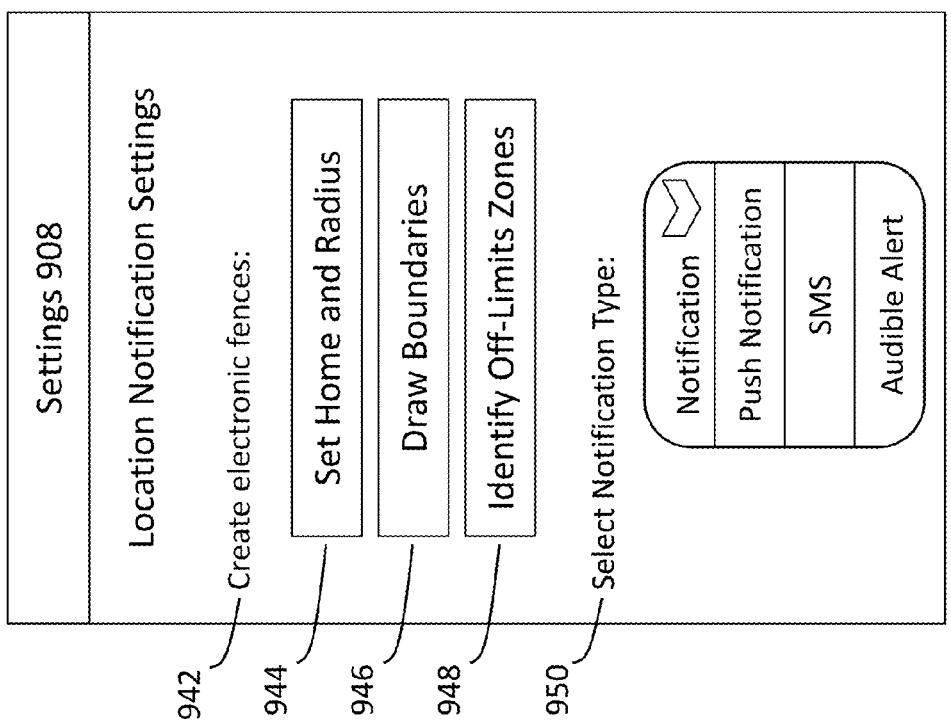

FIG. 9E shows an exemplary settings interface 908. Settings can include electronic fence settings 942. A user may specify a home location and/or permissible radius from the home using a home and radius setting 944. In embodiments, a user may draw boundaries (e.g., to designate a property and/or one or more areas within a property, such as a yard) using a draw boundaries setting 946. A user may designate impermissible areas with a off-limits zones setting 948. In embodiments, the user may assign names to zones or areas, such as "home," "yard", and/or "park," to name a few. The settings interface 908 can also include notification settings, such as a notification type 950 (e.g., push notification, SMS, email, phone call, and/or audible alert at a user device), to name a few.

FIG. 9F illustrates an exemplary alert related to a software-based electronic fence. The alert 962 indicates that a pet named Baxter has left an area identified as the yard.

The wearable communications device 100 can also be connected with an associated pet-related social media network. Among many other features, such a network can allow for the broadcasting of missing pet alerts (or "Fido Alerts") to anyone registered in the same geographic area as a lost pet. These lost pet alerts can be posted directly by a owner, e.g., from a mobile phone or computer.

FIGS. 10A-L are exemplary screen shots of a mobile program product for participating in a social media network according to an exemplary embodiments of the present invention.

Figure 10B:
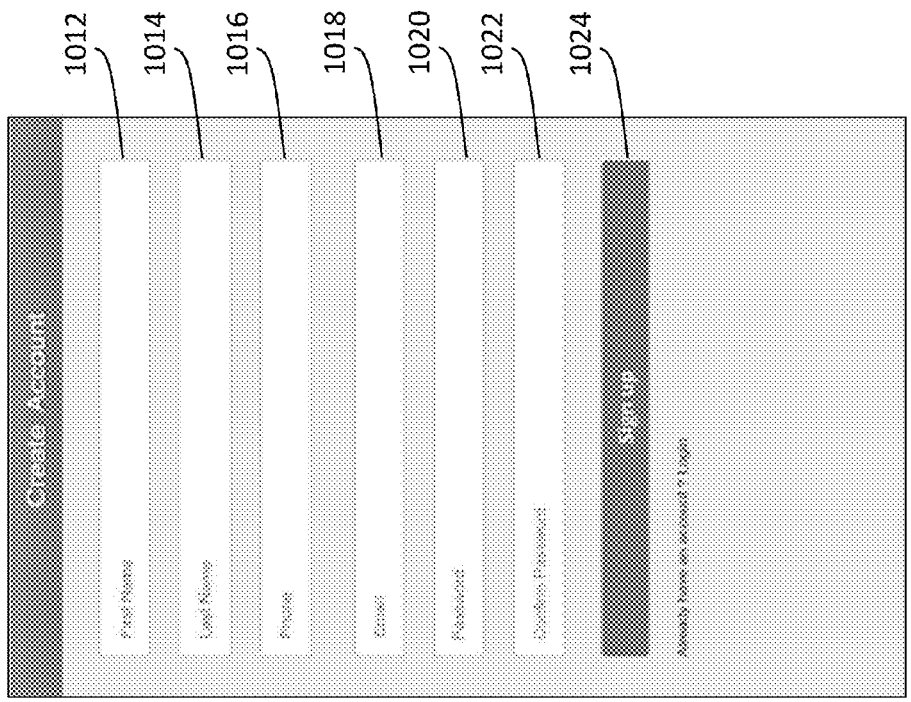
FIGS. 10A-L are exemplary screen shots of a mobile program product for participating in a social media network according to an exemplary embodiments of the present invention.
Figure 10A:
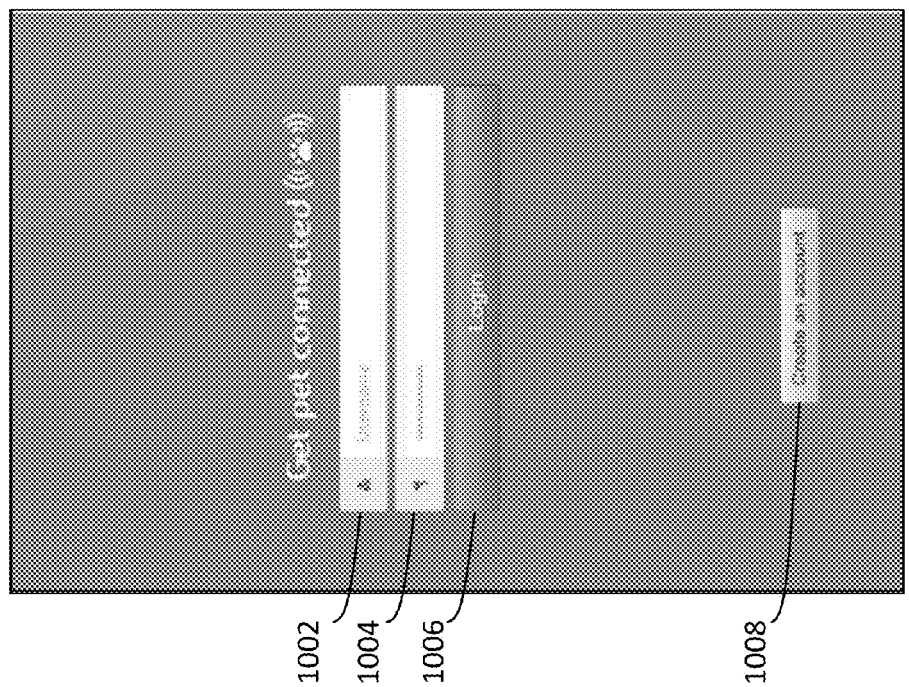

FIG. 10A shows an exemplary login interface having a username field 1002 and a password field 1004 for input of a user's account credentials. The login credentials may be submitted using a login and/or submit option 1006. The interface may include an account creation option 1008.

FIG. 10B shows an exemplary account creation interface. The interface can include various input fields, such as first name 1012, last name 1014, phone number 1016, email address 1018, password 1020, and/or password confirmation 1022. A sign up option 1024 may submit the inputted data to create a new account.

Figure 10D:
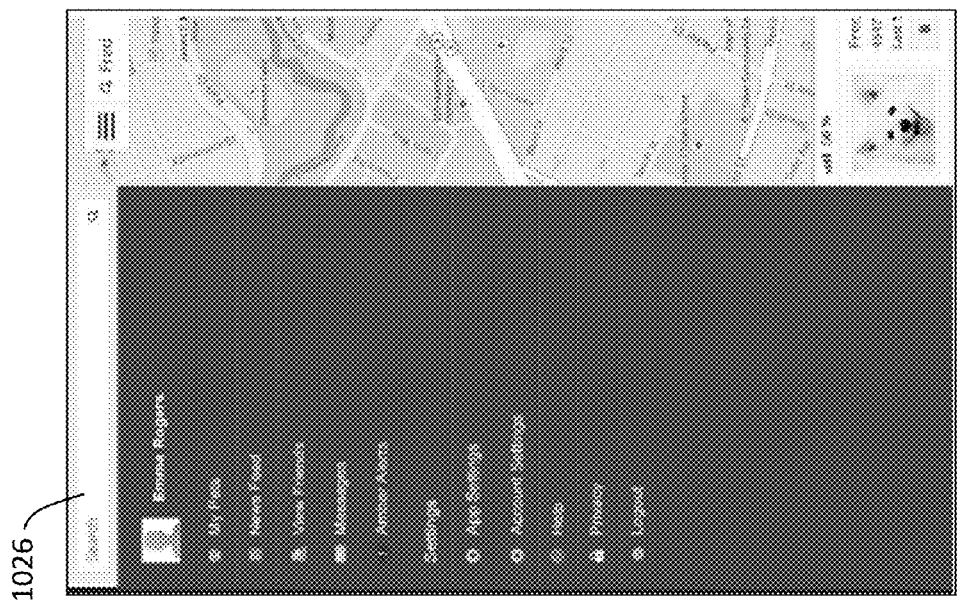
Figure 10C:
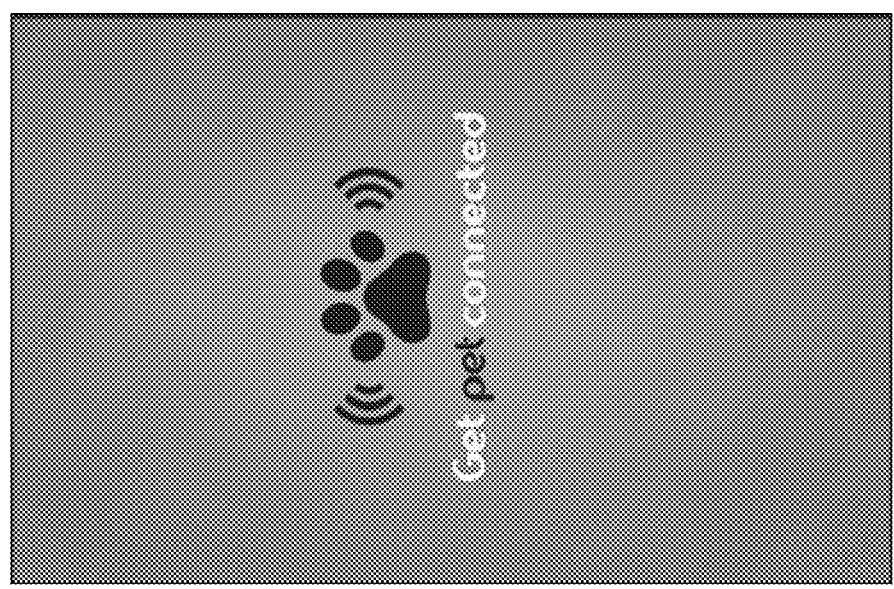

FIG. 10C shows an exemplary splash screen for a pet-related mobile application.

FIG. 10D shows an interface providing a menu of user options. A search bar 1026 can enable a user to search for pets, pet owners, pet-related groups (e.g., a puppy play group), pet-related businesses (e.g., veterinarians and/or pet supply stores), pet-related destinations (e.g., parks), and/or pet-related events (e.g., a community dog walk), to name a few.

Figure 10F:
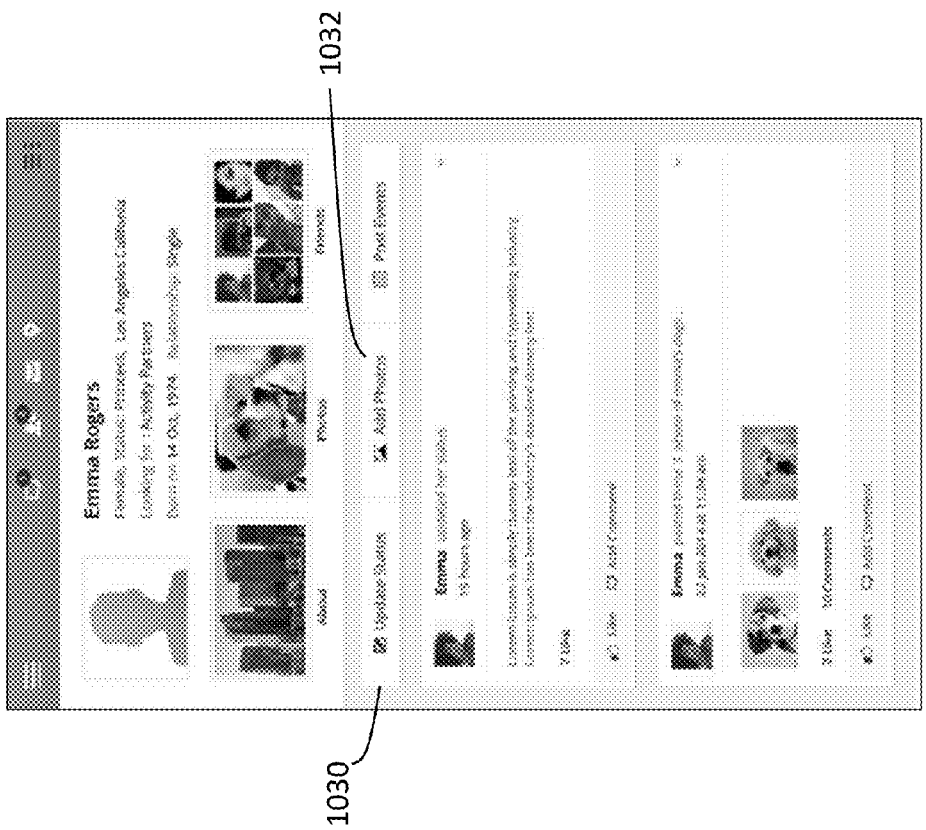
Figure 10E:
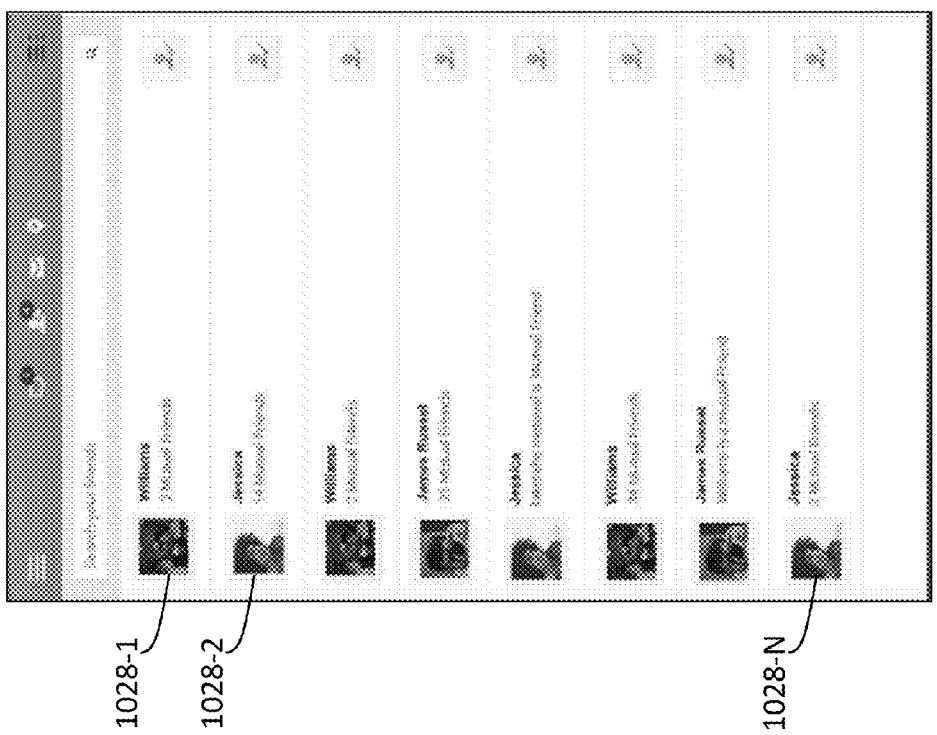

FIG. 10E shows an interface providing user contacts 1028, which may be pet owners and/or pet enthusiasts.

FIG. 10F shows an interface for a user home screen, which may provide various options and/or information. For example, a user may post a status using a status option 1030 and/or may post an image using an add photo option 1032.

Figure 10H:
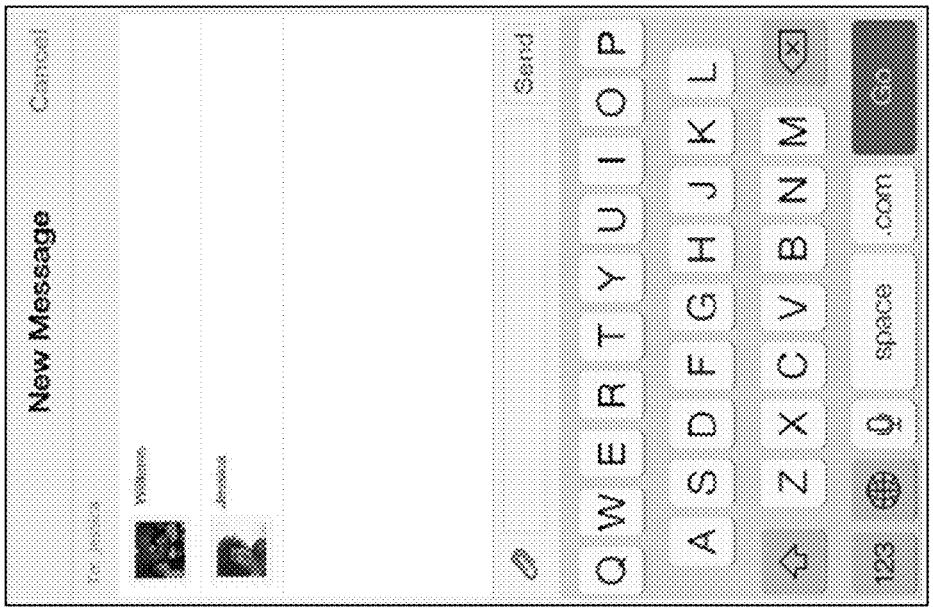
Figure 10G:
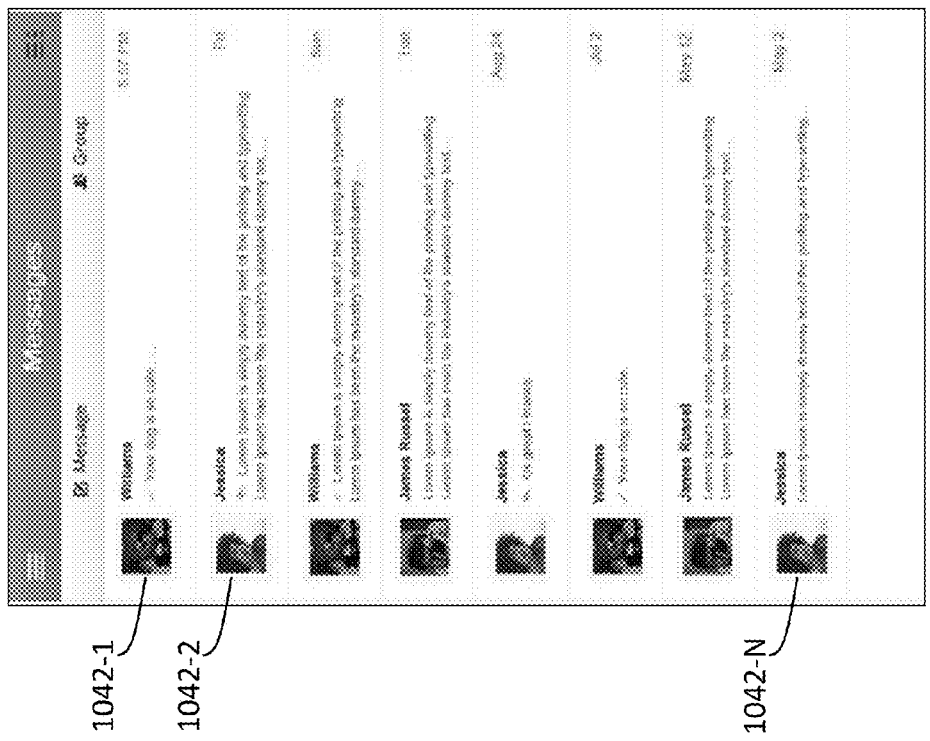

FIG. 10G shows a messages interface, which can provide one or more messages 1042, which may be inbox and/or outbox messages and/or which may be sent to one or more recipients.

FIG. 10H shows an interface for composing and sending a new message to one or more recipients via the social network.

Figure 10J:
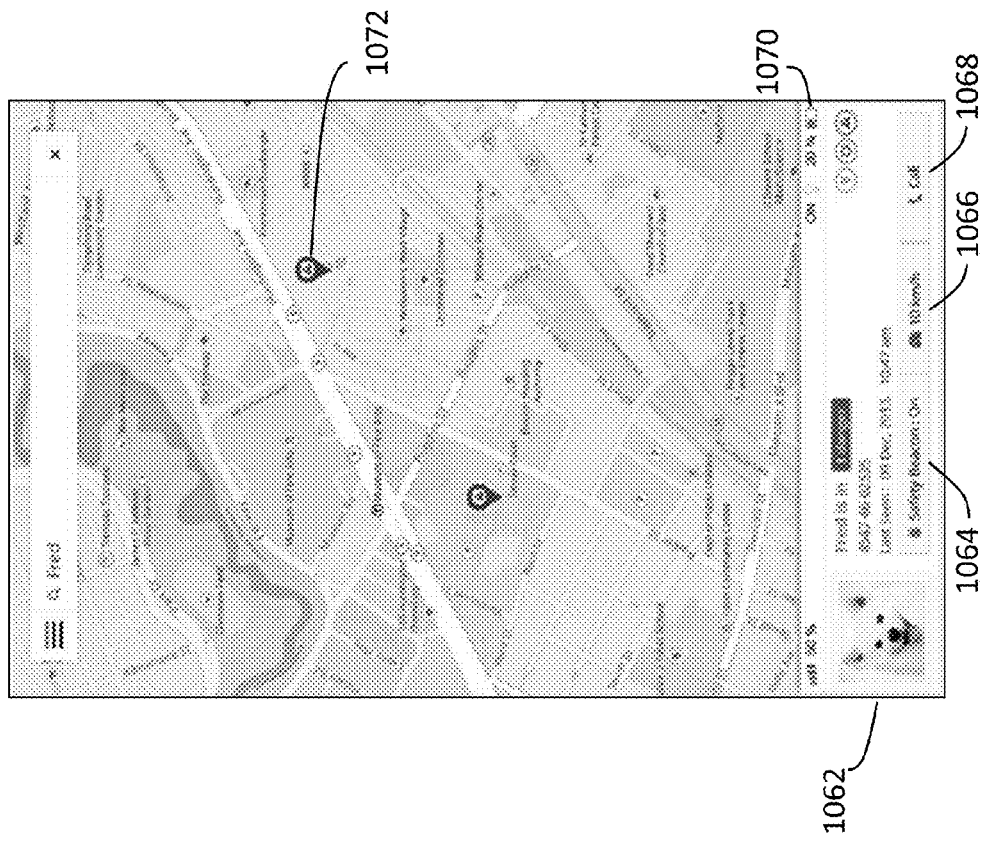
Figure 10I:
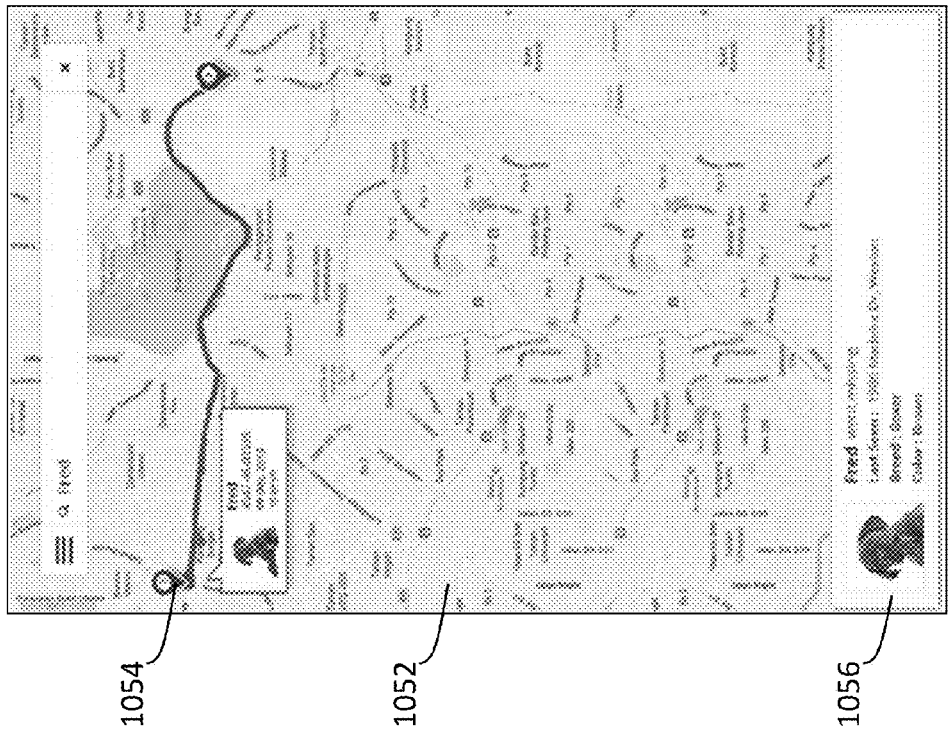

FIG. 10I shows an interface for tracking a pet that is listed on the social network. A map 1052 may show a location 1054 of the pet. The map may also show a history of past locations, such as a path that the pet has traveled. The interface may provide pet information 1056, which can include a picture of the pet, the pet's name, status information (e.g., whether the pet is missing), breed information, color information, and/or information regarding when and/or where the pet was last seen.

FIG. 10J shows another exemplary interface for tracking a pet listed on the social network. A map may show one or more locations 1072 where the pet was detected. The interface can also provide pet information 1062, such as pet descriptive information (e.g., breed and/or color), pet name, pet status (e.g., missing, in danger, safe), and/or information (e.g., date and/or time) about when the pet was last seen. Information may also be provided about a pet wearable device. A beacon status indicator 1064 may identify whether a safety beacon is turned on or off. A current or last determined speed 1066 may be provided. The interface can provide a call option 1068 to call the pet wearable device associated with the pet. Additional wearable device status information 1070 may be provided, such as battery life and/or communications signal strength.

Figure 10L:
Figure 10K:
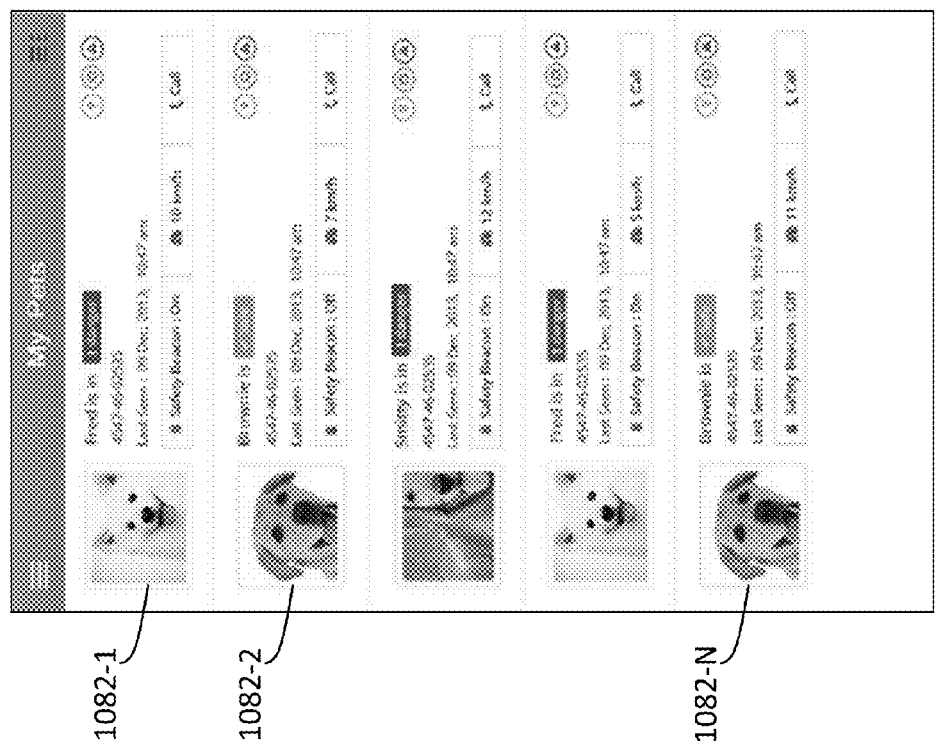

FIG. 10K shows an interface listing pet information 1082 for one or more pets associated with a user of a pet-related social network.

FIG. 10L shows an interface listing alerts 1092 that have been generated and/or broadcast across the social network. Such alerts may identify missing pets and/or pets that may be in danger.

FIGS. 11A-D are exemplary screen shots of interfaces for a website program product for participating in a social media network according to an exemplary embodiments of the present invention.

Figure 11A:
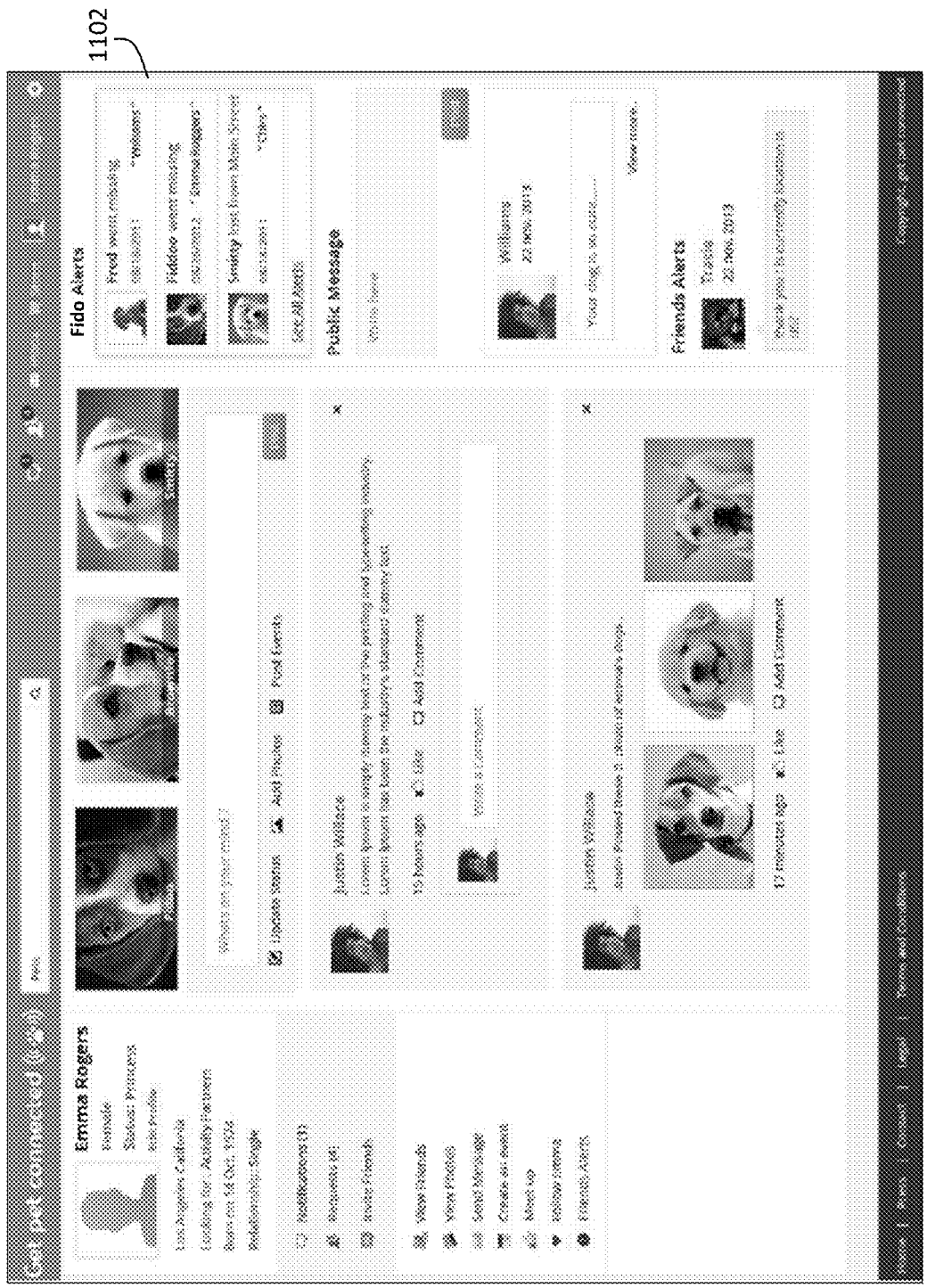
FIGS. 11A-D are exemplary screen shots of interfaces for a website program product for participating in a social media network according to an exemplary embodiments of the present invention.

FIG. 11A shows an exemplary home interface for a user of the social network. The interface may include pet alerts 1102.

Figure 11B:
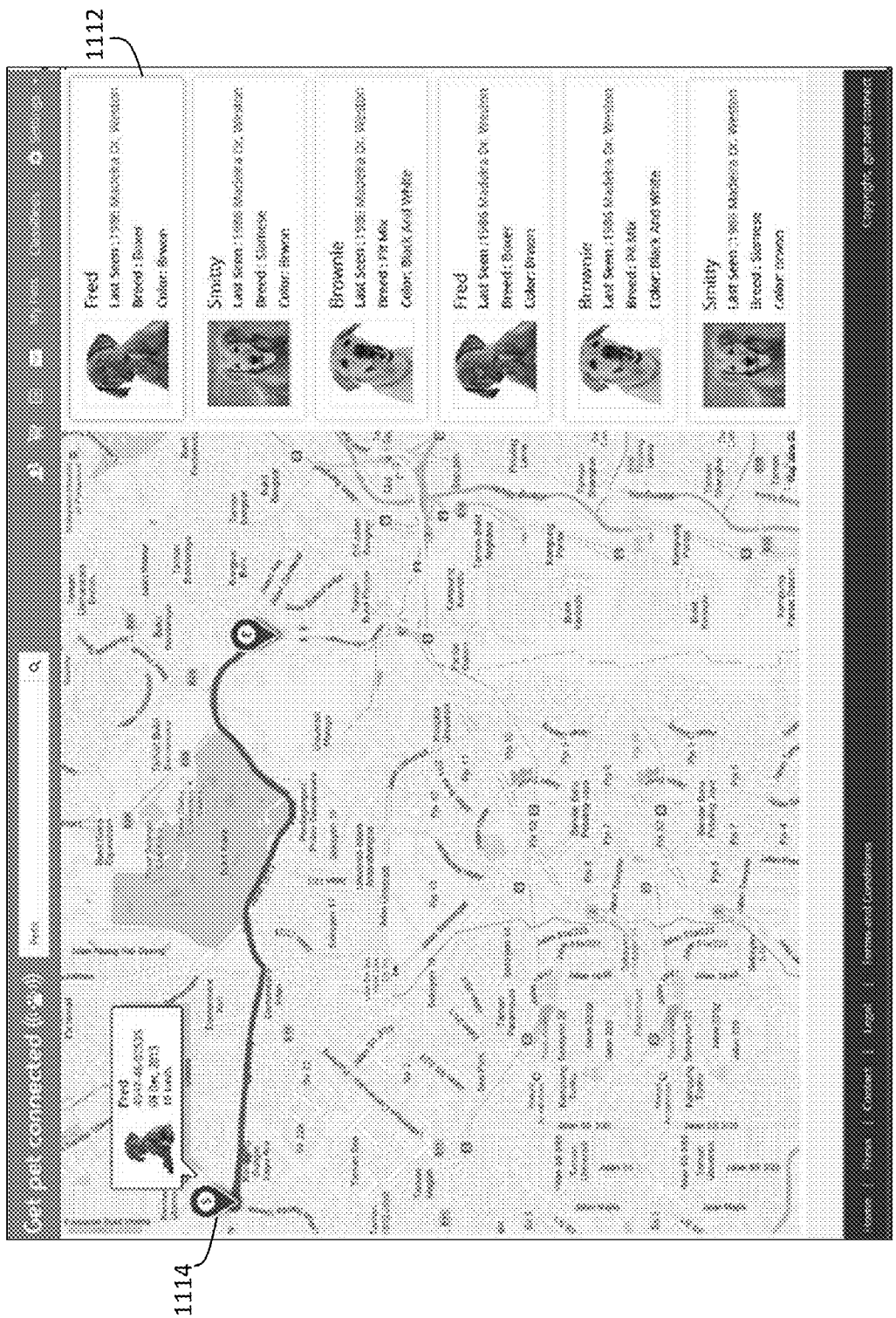

FIG. 11B shows an interface for tracking data for a pet. A map may show one or more identified locations 1114 corresponding to a pet wearable device associated with the pet. The interface may provide a listing of alerts 1112 for one or more pets. In embodiments, the interface may provide a listing of pets that are contacts of the user.

Figure 11C:
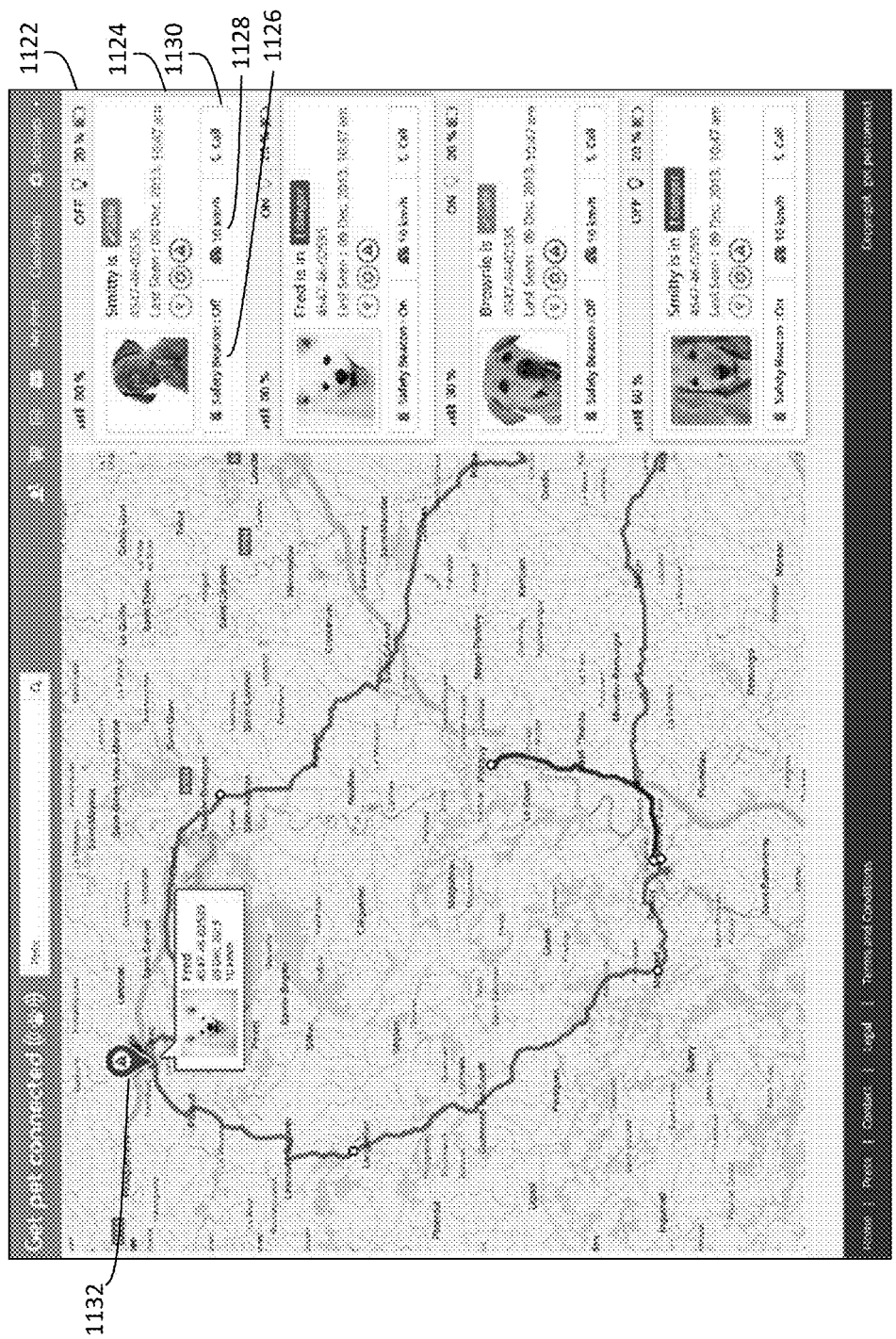

FIG. 11C shows another interface for tracking data for pets listed on the social network. A map may identify a location 1132. An information listing may provide, for one or more pets listed on the social network, pet wearable device status information 1122, pet information 1124 (e.g., date when last seen, pet status, such as safe or missing), safety beacon status information 1126 (e.g., whether a beacon or indicator light on a pet wearable device is on), speed information 1128, and a call option 1130.

Figure 11D:

FIG. 11D shows an interface listing a plurality of alerts 1142 for lost pets. A user may select an alert to retrieve more information related to the pet and/or its pet wearable device.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A wearable communications device for a pet, comprising:
 (a) a band with fastenable ends having an elongated body portion configured to fit around a neck of the pet;

(b) a leash attachment comprising at least one loop configured to mate the wearable communications device to a pet leash;
(c) a communications unit integral to the band, the communications unit comprising:
  (i) a communications chipset;
  (ii) one or more processors operably connected to the communications chipset;
  (iii) a sound generation circuit comprising an audio speaker, the sound generation circuit operably connected to the one or more processors;
  (iv) a dog bark sensor operably connected to the one or more processors;
  (v) one or more light sources operably connected to the one or more processors and configured to be switched on in response to a control signal received from a user device to facilitate visual location of the pet wearing the wearable communications device;
  (vi) one or more removable, rechargeable batteries providing power to the communications unit;
  (vii) non-transitory computer-readable memory having stored thereon first machine-readable instructions configured to cause the communications unit to enter a standby power-saving mode at least in response to detecting by the communications chipset a proximity to a recognized user device, the non-transitory computer readable memory further having stored thereon second machine-readable instructions configured to perform the following steps:
    (A) receiving, at the communications chipset via a wireless connection, one or more first electronic data packets comprising a machine-readable electronic audio segment file;
    (B) communicating, from the communications chipset to the one or more processors, the one or more first electronic data packets;
    (C) converting, by the one or more processors, the one or more first electronic data packets into first electronic signals that cause the audio speaker to play a corresponding first audio message for the pet;
    (D) transmitting, from the one or more processors to the sound generation circuit, the first electronic signals;
    (E) playing, by the audio speaker, the corresponding first audio message for the pet.

2. The wearable communications device of claim 1, wherein the second machine-readable instructions are further configured to perform the steps of:
  (F) receiving, at the communications chipset, one or more second electronic data packets comprising a text message corresponding to a second audio message for a pet;
  (G) transcoding, by the one or more processors, the text message into second electronic signals corresponding to the second audio message;
  (H) transmitting, from the one or more processors to the sound generation circuit, the second electronic signals;
  (I) playing, by the audio speaker, the second audio message for the pet.

3. The wearable communications device of claim 1, wherein the first audio message comprises at least one audio component within a frequency range of 15-60 kHz.

4. The wearable communications device of claim 1, wherein the first audio message comprises at least one audio component within a frequency range of 23-54 kHz.

5. The wearable communications device of claim 1, wherein the band forms a portion of a pet harness.

6. The wearable communications device of claim 1, wherein the communications unit is integral to the band.

7. The wearable communications device of claim 1, wherein the communications unit is removably attached to the band.

8. The wearable communications device of claim 1, further comprising at least one of a pre-programmed communication transmission button, one or more microphones, one or more cameras, one or more digital display screens, or a GPS receiver.

9. The wearable communications device of claim 1, wherein the communications unit further comprises:
  (vii) a location information chipset, and
wherein the second machine-readable instructions are further configured to perform the steps of:
  (F) determining, by the location information chipset, a first position of the communications device corresponding to a first time;
  (G) communicating, from the location information chipset to the one or more processors, the first position;
  (H) determining, by the location information chipset, a second position of the communications device corresponding to a second time;
  (I) communicating, from the location information chipset to the one or more processors, the second position;
  (J) calculating, by the one or more processors, an average speed based at least in part on the first position and the second position;
  (K) determining, by the one or more processors, whether the average speed exceeds a predefined threshold speed;
  (L) generating, by the one or more processors, an electronic message indicating that the predefined threshold speed was exceeded;
  (M) communicating, from the one or more processors to the communications chipset, the electronic message;
  (N) transmitting, by the communications chipset, the electronic message.

10. A wearable communications device for a pet, comprising:
  (a) a band with fastenable ends having an elongated body portion configured to fit around a neck of the pet;
  (b) a leash attachment comprising at least one loop configured to mate the wearable communications device to a pet leash;
  (c) a communications unit integral to the band, the communications unit comprising:
    (i) a communications chipset;
    (ii) one or more processors operably connected to the communications chipset;
    (iii) a sound generation circuit comprising an audio speaker, the sound generation circuit operably connected to the one or more processors;
    (iv) a dog bark sensor operably connected to the one or more processors;
    (v) one or more light sources operably connected to the one or more processors and configured to be switched on in response to a control signal received from a user device to facilitate visual location of the pet wearing the wearable communications device;
    (vi) one or more removable batteries providing power to the communications unit;
    (vii) non-transitory computer-readable memory having stored thereon first machine-readable instructions configured to cause the communications unit to enter a standby power-saving mode at least in response to detecting by the communications chipset a proximity to a recognized user device, the non-transitory computer readable memory further having stored thereon second machine-readable instructions configured to perform the following steps:

(A) receiving, at the communications unit via a wireless connection, one or more first electronic data packets comprising one or more machine-readable electronic audio segment files each corresponding to an audio message for a pet;

(B) storing, in the non-transitory computer-readable memory, the one or more machine-readable electronic audio segment files;

(C) receiving, at the communications chipset, one or more second electronic data packets comprising third machine-readable instructions to play one of the one or more machine-readable electronic audio segment files;

(D) communicating, from the communications chipset to the one or more processors, the one or more second electronic data packets;

(E) transmitting, from the one or more processors to the sound generation circuit in response to the one or more second electronic data packets, electronic signals corresponding to the one of the one or more machine-readable electronic audio segment files;

(F) playing, by the audio speaker, the audio message for the pet.

11. The wearable communications device of claim 10, wherein the step of receiving, at the communications unit, one or more first electronic data packets comprising one or more machine-readable electronic audio segment files comprises receiving, via the communications chipset, one or more uploaded audio segment files.

12. The wearable communications device of claim 10, further comprising a microphone and an analog-to-digital audio converter.

13. The wearable communications device of claim 12, wherein the step of receiving, at the communications unit, one or more first electronic data packets comprising one or more machine-readable electronic audio segment files comprises:

receiving, via the microphone, one or more input audio waves; and converting, by the analog-to-digital audio converter, the one or more input audio waves to the one or more electronic audio segment files.

14. The wearable communications device of claim 10, wherein the band forms a portion of a pet harness.

15. The wearable communications device of claim 10, wherein the communications unit is integral to the band.

16. The wearable communications device of claim 10, wherein the communications unit is removably attached to the band.

17. The wearable communications device of claim 10, further comprising at least one of a pre-programmed communication transmission button, one or more microphones, one or more cameras, one or more digital display screens, or a GPS receiver.

18. The wearable communications device of claim 10, wherein the communications unit further comprises:

(vii) a location information chipset, and wherein the machine-readable instructions are further configured to perform the steps of:

(G) determining, by the location information chipset, a first position of the communications device corresponding to a first time;

(H) communicating, from the location information chipset to the one or more processors, the first position;

(I) determining, by the location information chipset, a second position of the communications device corresponding to a second time;

(J) communicating, from the location information chipset to the one or more processors, the second position;

(K) calculating, by the one or more processors, an average speed based at least in part on the first position and the second position;

(L) determining, by the one or more processors, whether the average speed exceeds a predefined threshold speed;

(M) generating, by the one or more processors, an electronic message indicating that the predefined threshold speed was exceeded;

(N) communicating, from the one or more processors to the communications chipset, the electronic message;

(O) transmitting, by the communications chipset, the electronic message.

* * * * *